(12) United States Patent
Mizin et al.

(10) Patent No.: US 10,982,727 B2
(45) Date of Patent: Apr. 20, 2021

(54) PROTECTION DEVICE BRAKING MECHANISM

(71) Applicant: Honeywell International Inc., Morris Plains, NJ (US)

(72) Inventors: Denis Mizin, Brno (CZ); Vaclav Hruza, Brno-Žabovřesky (CZ); Radim Svoboda, Bojkovice (CZ); Pavel Marak, Brno (CZ)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 13 days.

(21) Appl. No.: 16/376,359

(22) Filed: Apr. 5, 2019

(65) Prior Publication Data
US 2020/0318699 A1 Oct. 8, 2020

(51) Int. Cl.
*F16D 63/00* (2006.01)
*B61H 9/02* (2006.01)
(Continued)

(52) U.S. Cl.
CPC .............. *F16D 63/008* (2013.01); *A62B 1/14* (2013.01); *B61H 9/02* (2013.01); *B61B 7/00* (2013.01)

(58) Field of Classification Search
CPC ........ F16D 63/008; F16D 59/00; F16D 59/02; F16D 2127/06; B61H 9/02; B61B 7/00; A62B 1/14
See application file for complete search history.

(56) References Cited

U.S. PATENT DOCUMENTS 3,874,632 A * 4/1975 Rago .................. A62B 1/00
182/3
4,282,953 A 8/1981 Lichti
(Continued)

FOREIGN PATENT DOCUMENTS

CN 101091034 A 12/2007
CN 102281923 A 12/2011
(Continued)

OTHER PUBLICATIONS

European search opinion issued in European Application No. 20167848.9 dated Nov. 17, 2020, 4 pages.
(Continued)

*Primary Examiner* — Melody M Burch
(74) *Attorney, Agent, or Firm* — Alston & Bird LLP

(57) ABSTRACT

A protection device for traversing a guide member and method of making the like, the protection device includes a wheel configured to engage the guide member. In some embodiments, the protection embodiment includes a locker configured to engage a braking surface. The locker engagement mechanism configured to releasably engage the locker. In some embodiments, a centrifugal actuator operatively coupled to the wheel and configured to actuate the locker engagement mechanism to release the locker based on a threshold speed of the wheel. In an instance in which the wheel is rotating at or above the threshold speed of the wheel in a first direction, the centrifugal actuator is configured to actuate and rotate the locker engagement mechanism to release the locker and to allow the locker to rotate and engage the braking surface. A corresponding method of operation is also provided.

17 Claims, 14 Drawing Sheets

(51) Int. Cl.
*A62B 1/14* (2006.01)
*B61B 7/00* (2006.01)

(56) References Cited

U.S. PATENT DOCUMENTS

| | | | | |
|---|---|---|---|---|
| 4,359,139 | A * | 11/1982 | Bloder | A62B 1/10 |
| | | | | 182/234 |
| 5,186,289 | A | 2/1993 | Wolner et al. | |
| 6,814,185 | B1 * | 11/2004 | Ostrobrod | A62B 1/14 |
| | | | | 182/191 |
| 6,962,238 | B1 | 11/2005 | Ostrobrod | |
| 7,000,436 | B2 * | 2/2006 | Peterson | G05B 19/108 |
| | | | | 68/12.04 |
| 2005/0082115 | A1 * | 4/2005 | Petzl | A62B 1/14 |
| | | | | 182/5 |
| 2009/0084630 | A1 * | 4/2009 | Argoud | E06C 7/187 |
| | | | | 182/192 |
| 2016/0001100 | A1 * | 1/2016 | Hirst | A62B 35/0056 |
| | | | | 182/236 |
| 2018/0135708 | A1 | 5/2018 | Jacobson | |
| 2018/0180116 | A1 * | 6/2018 | Hsu | B62K 9/00 |
| 2018/0181106 | A1 | 6/2018 | Sonoda et al. | |

FOREIGN PATENT DOCUMENTS

| | | |
|---|---|---|
| CN | 105073204 A | 11/2015 |
| CN | 108071714 A | 5/2018 |
| CN | 108237840 A | 7/2018 |
| CN | 108869579 A | 11/2018 |
| EP | 1820539 B1 | 4/2009 |
| EP | 3088763 A1 | 11/2016 |
| GB | 2376051 A | 12/2002 |
| WO | 2013/047222 A1 | 4/2013 |

OTHER PUBLICATIONS

European search report issued in European Application No. 20167848.9 dated Nov. 17, 2020, 2 pages.
Office Action issued in Chinese Application No. 202010267486.0 dated Feb. 2, 2021, 26 pages.

* cited by examiner

PROTECTION DEVICE BRAKING MECHANISM

TECHNOLOGICAL FIELD

An example embodiment relates generally to protection devices and the method of operating the like and, more particularly, to protection devices configured with one or more braking devices to be activated based on the speed of the protection device.

BACKGROUND

From recreation to survival devices, protection devices are instrumental in preserving the safety of users and devices when traversing uncertain conditions and heights. In order to operate effectively, protection devices must be able to freely travel along a guide member to allow freedom of movement, while also quickly arresting unwanted or excessive movement, such as during a fall. Current protection devices struggle to effectively change between free travel of the protection device and stoppage of the protection device, and are often restricted in their operation to certain orientations and certain directions of motion. Applicant has identified a number of deficiencies and problems associated with current sensors. Through applied effort, ingenuity, and innovation, many of these identified problems have been solved by the methods and apparatus of the present disclosure.

BRIEF SUMMARY

The following presents a simplified summary in order to provide a basic understanding of some aspects of the present disclosure. This summary is not an extensive overview and is intended to neither identify key or critical elements nor delineate the scope of such elements. Its purpose is to present some concepts of the described features in a simplified form as a prelude to the more detailed description that is presented later.

In an example embodiment, a protection device for traversing a guide member is provided. The protection device includes a wheel configured to engage the guide member. The protection device also includes a locker configured to engage a braking surface. The protection device further includes a locker engagement mechanism configured to releasably engage the locker. The protection device still further includes a centrifugal actuator operatively coupled to the wheel and configured to actuate the locker engagement mechanism to release the locker based on a threshold speed of the wheel. In an instance in which the wheel is rotating at or above the threshold speed of the wheel in a first direction, the centrifugal actuator is configured to actuate and rotate the locker engagement mechanism to release the locker and to allow the locker to rotate and engage the braking surface.

In some embodiments, the protection device also includes a second locker configured to engage the braking surface. In such an embodiment, in an instance in which the wheel is rotating at or above a second threshold speed in a second direction opposite the first direction, the centrifugal actuator is configured to actuate and rotate the locker engagement mechanism to allow the second locker to rotate and engage the braking surface.

In some embodiments, the protection device also includes a wheel housing configured to at least partially contain the wheel, the centrifugal actuator, the locker engagement mechanism, and the locker. In some embodiments, the braking surface is at least a portion of the guide member. In some embodiments, the guide member is a cable.

In some embodiments, in an instance in which the wheel is rotating at or above the threshold speed of the wheel in a second direction, the locker engagement mechanism is configured to remain engaged with the locker. In some embodiments, the protection device also includes an actuator plate and an actuator arm. In such an embodiment, the actuator plate is connected to the locker and the actuator arm is configured to move from a first released position to a second engaging position to move the actuator plate to cause the locker to rotatably engage the locker engagement mechanism.

In some embodiments, the protection device also includes an actuator plate and an actuator arm. In such an embodiment, the locker and the second locker are coupled to the actuator plate, the actuator arm is configured to move the actuator plate in a first engaging direction to cause the locker to rotatably engage the locker engagement mechanism, and the actuator arm is configured to move the actuator plate in a second engaging direction to cause the second locker to rotatably engage the locker engagement mechanism.

In some embodiments, the centrifugal actuator is disposed within a circumference of the wheel. In some embodiments, the centrifugal actuator includes a centrifugal component arm within a circumference of the wheel. In some embodiments, the locker engagement mechanism includes a ring actuated by the centrifugal component arm inside of the wheel. In such embodiments, the ring includes a protrusion around a portion of the ring configured to restrict the rotatable movement of the locker below the threshold speed of the wheel in the first direction. In some embodiments, the wheel rotates on a first axis and the locker rotates on a second axis. In some embodiments, the centrifugal actuator rotates on the first axis. In some embodiments, the second axis is outside of a circumference the wheel.

In another example embodiment, a protection device for navigating a guide member is provided. The protection device includes a wheel configured to rotatably engage the guide member. The protection device also includes a first locker and a second locker, the first locker and the second locker configured to engage a braking surface. The protection device further includes at least one locker engagement mechanism configured to releasably engage at least one of the first locker or the second locker. The protection device still further includes at least one centrifugal actuator operatively coupled to the wheel and configured to actuate at least one of the at least one locker engagement mechanism to release at least one of the first locker at a first threshold speed of the wheel or the second locker at a second threshold speed of the wheel. In an instance in which the wheel is rotating at or above the first threshold speed of the wheel in a first direction, one of the at least one centrifugal actuator is configured to actuate and rotate one of the at least one locker engagement mechanism to release the first locker and to allow the first locker to rotate and engage the braking surface. In an instance in which the wheel is rotating at or above the second threshold speed of the wheel in a second direction, one of the at least one centrifugal actuator is configured to actuate and rotate one of the at least one locker engagement mechanism to release the second locker and to allow the second locker to rotate and engage the braking surface.

In some embodiments, the first threshold speed and the second threshold speed are equal. In some embodiments, the protection device also includes a wheel housing configured to at least partially contain the wheel, the at least one centrifugal actuator, the at least one locker engagement mechanism, and the first and second locker. In some embodiments, the braking surface is at least a portion of the guide member. In some embodiments, the guide member is a cable.

In some embodiments, in an instance in which the wheel is rotating at or above the first threshold speed of the wheel in the second direction, at least one of the at least one locker engagement mechanism is configured to remain engaged with the first locker. In such an embodiment, in an instance in which the wheel is rotating at or above the second threshold speed of the wheel in the first direction, at least one of the at least one locker engagement mechanism is configured to remain engaged with the second locker.

In some embodiments, the protection device also includes an actuator plate and an actuator arm. In such an embodiment, the first locker and the second locker are coupled to the actuator plate, the actuator arm is configured to move the actuator plate in a first engaging direction to cause the first locker to rotatably engage the locker engagement mechanism, and the actuator arm is configured to move the actuator plate in a second engaging direction to cause the second locker to rotatably engage the locker engagement mechanism.

In some embodiments, at least one of the at least one centrifugal actuator is configured within a circumference of the wheel. In some embodiments, at least one of the at least one centrifugal actuator includes a centrifugal component arm inside a circumference of the wheel. In some embodiments, at least one of the at least one locker engagement mechanism includes a ring actuated by the centrifugal component arm inside of the wheel. In such an embodiment, the ring includes a protrusion around a portion of the ring configured to restrict the rotatable movement at least one of the first locker below the first threshold speed of the wheel in the first direction or the second locker below the second threshold speed of the wheel in the second direction.

In some embodiments, the wheel rotates on a first axis and the first locker rotates on a second axis. In some embodiments, the second locker rotates on a third axis. In some embodiments, the centrifugal actuator rotates on the first axis. In some embodiments, the second axis and the third axis are outside of a circumference of the wheel.

In still another example embodiment, a method of navigating a guide member with a protection device is provided. The method includes engaging a wheel with the guide member. The method also includes rotating a centrifugal actuator operatively coupled with the wheel at or above a first threshold speed of the wheel in a first direction. Based on the engagement of the centrifugal actuator, the method further includes actuating a locking engagement mechanism to release a locker. The method still further includes rotating the locker to engage with a braking surface.

In some embodiments, rotation of the locker may further be configured to displace an actuator plate, and displacement of the actuator plate may be configured to rotate an actuator arm from a first released position to a second engaging position.

In some embodiments, the method also includes engaging the centrifugal actuator operatively coupled with the wheel at or above a second threshold speed of the wheel in a second direction opposite the first direction. Based on the engagement of the centrifugal actuator, the method further includes actuating the locking engagement mechanism to release a second locker. The method still further includes rotating the second locker to engage with the braking surface.

In some embodiments, at least a portion of the wheel, the centrifugal actuator, the locker engagement mechanism, and the locker are contained in a housing. In some embodiments, the braking surface is at least a portion of the guide member. In some embodiments, the guide member is a cable. In some embodiments, in an instance in which the wheel is rotating at or above the threshold speed of the wheel in a second direction, the locker engagement mechanism is configured to remain engaged with the locker.

In some embodiments, the method also includes moving an actuator arm from a first released position to a second engaging position and based on the movement of the actuator arm, causing, via an actuator plate, the locker to rotatably engage the locker engagement mechanism.

In some embodiments, the method also includes moving an actuator arm in a first engaging direction. Based on the movement of the actuator arm in the first engaging direction, such a method also includes causing, via an actuator plate, the locker to rotatably engage the locker engagement mechanism. Such a method further includes moving the actuator arm in a second engaging direction. Based on the movement of the actuator arm in the second engaging direction, such a method still further includes causing, via the actuator plate, the second locker to rotatably engage the locker engagement mechanism.

In some embodiments, the centrifugal actuator is configured within a circumference of the wheel. In some embodiments, the centrifugal actuator includes a centrifugal component arm within a circumference of the wheel. In some embodiments, the locker engagement mechanism includes a ring actuated by the centrifugal component arm inside of the wheel, the ring comprising a protrusion around a portion of the ring configured to restrict the rotatable movement of the locker below the threshold speed of the wheel in the first direction. In some embodiments, the wheel rotates on a first axis and the locker rotates on a second axis. In some embodiments, the centrifugal actuator rotates on the first axis. In some embodiments, the second axis is outside of a circumference of the wheel.

In still another example embodiment, a method of resetting a braking device for a protection device is provided. The method may include moving an actuator arm in a first engaging direction. Based on the movement of the actuator arm in the first engaging direction, the method also may include causing, via an actuator plate, a first locker to rotatably engage a locker engagement mechanism. In some embodiments, the method further may include moving the actuator arm in a second engaging direction. Based on the movement of the actuator arm in the second engaging direction, the method still further may include causing, via the actuator plate, a second locker to rotatably engage the locker engagement mechanism.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
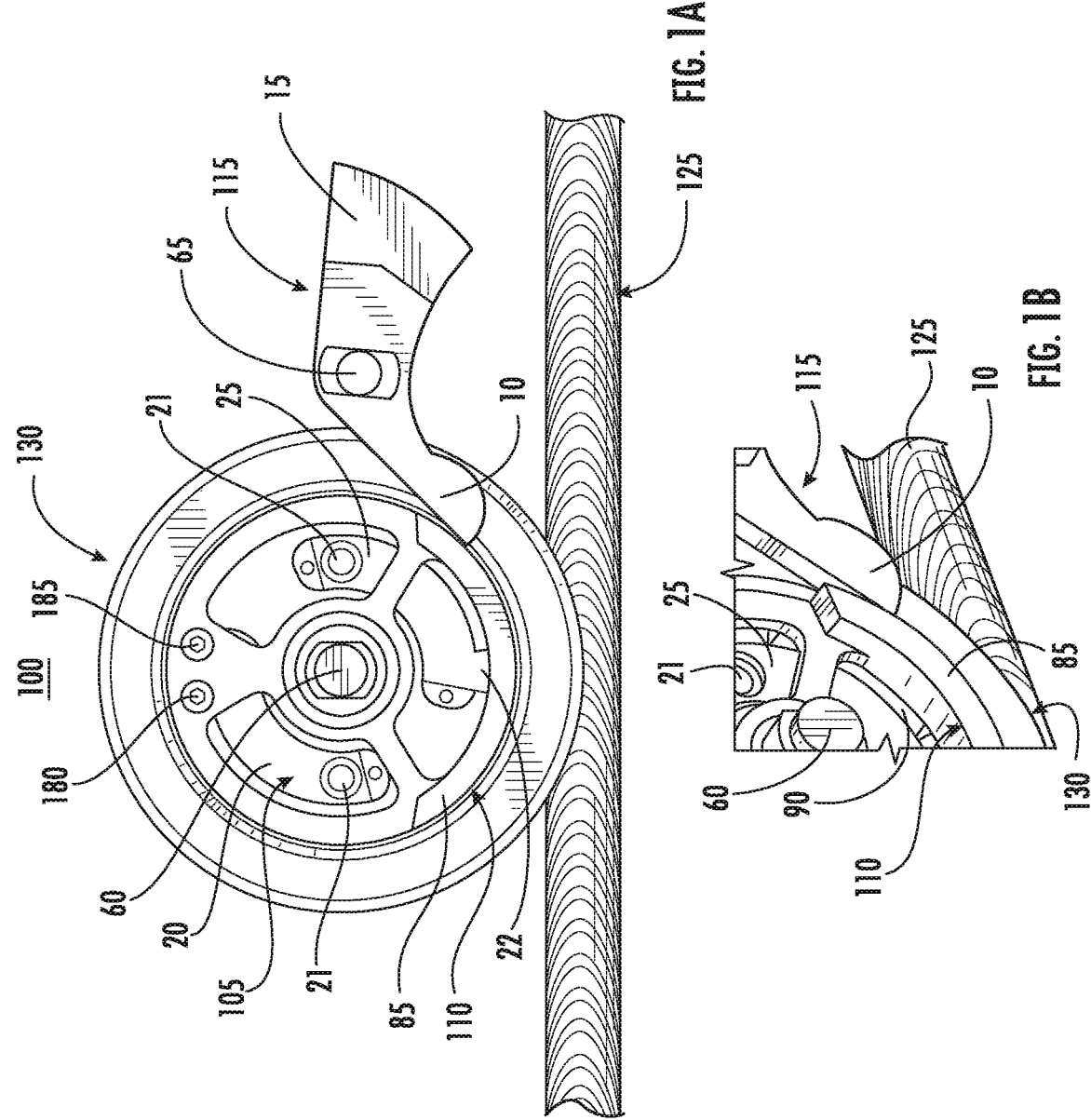
Figure 3:
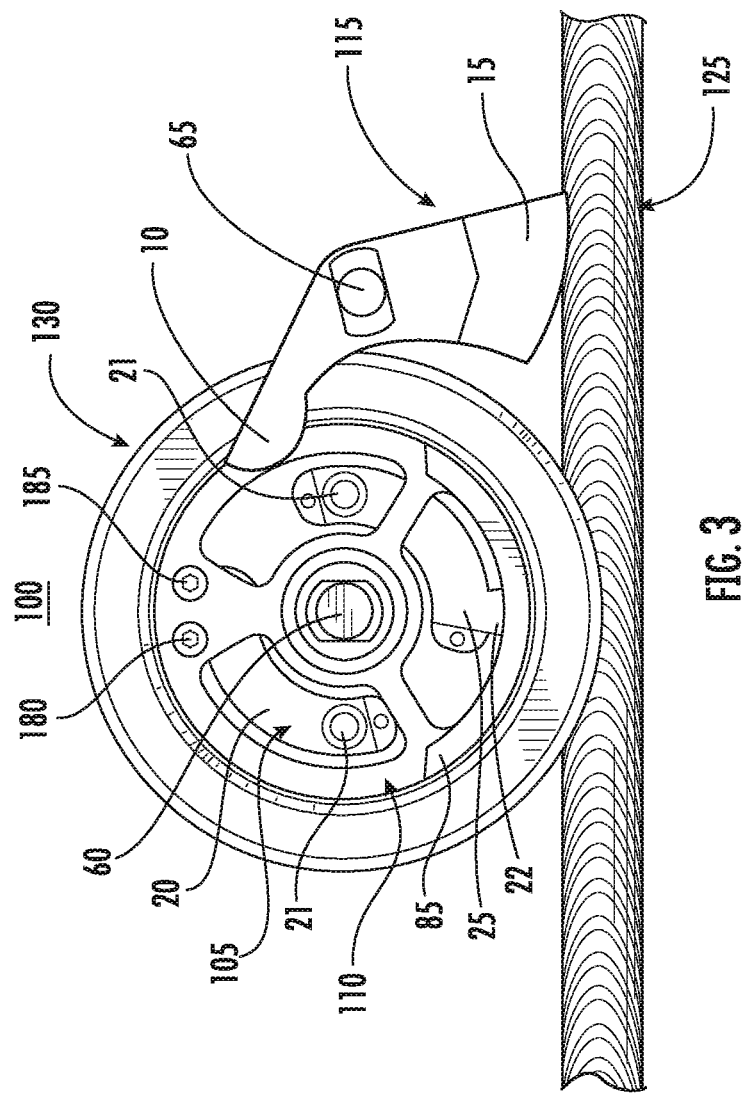
Figure 4:
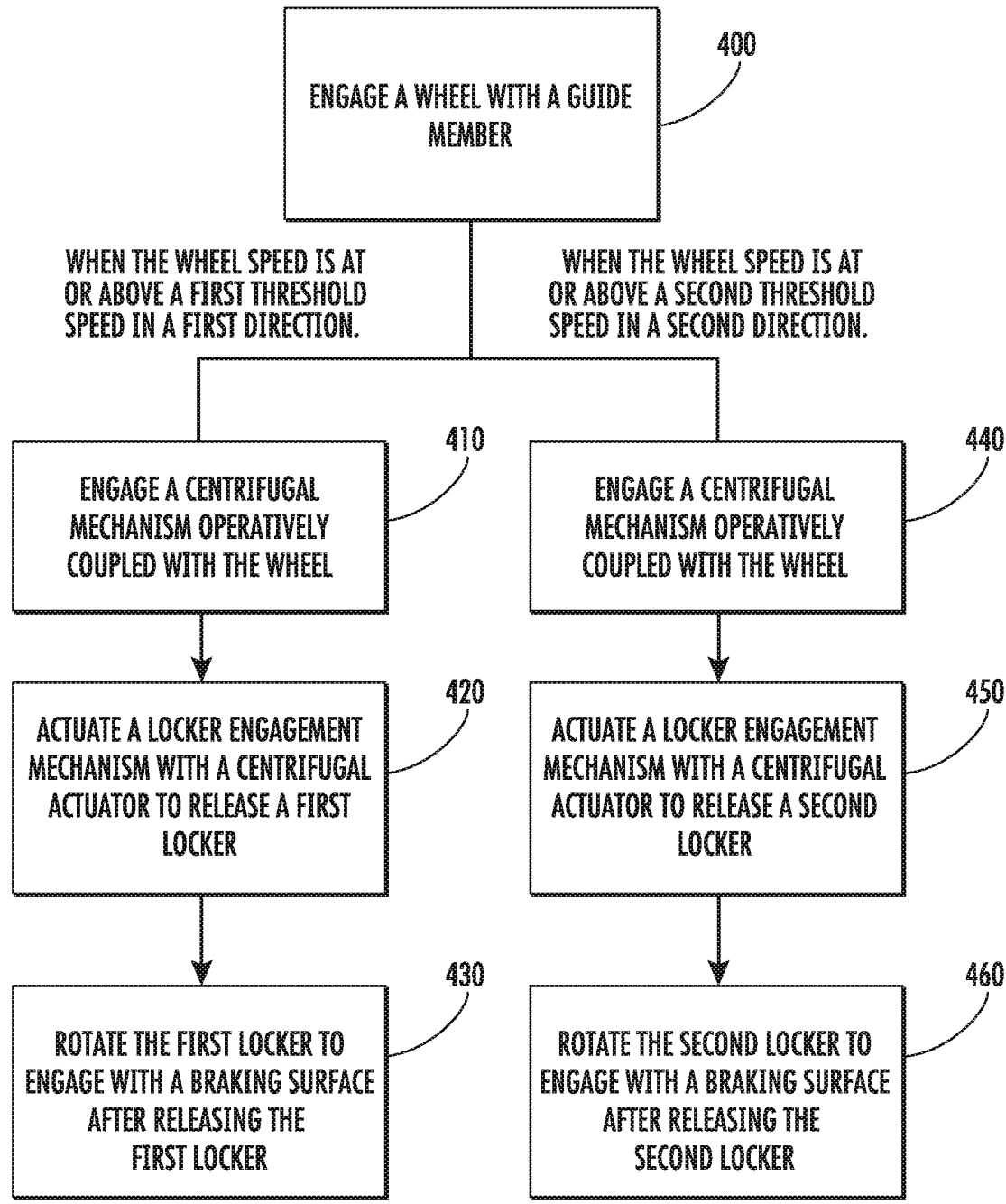
Figure 5:
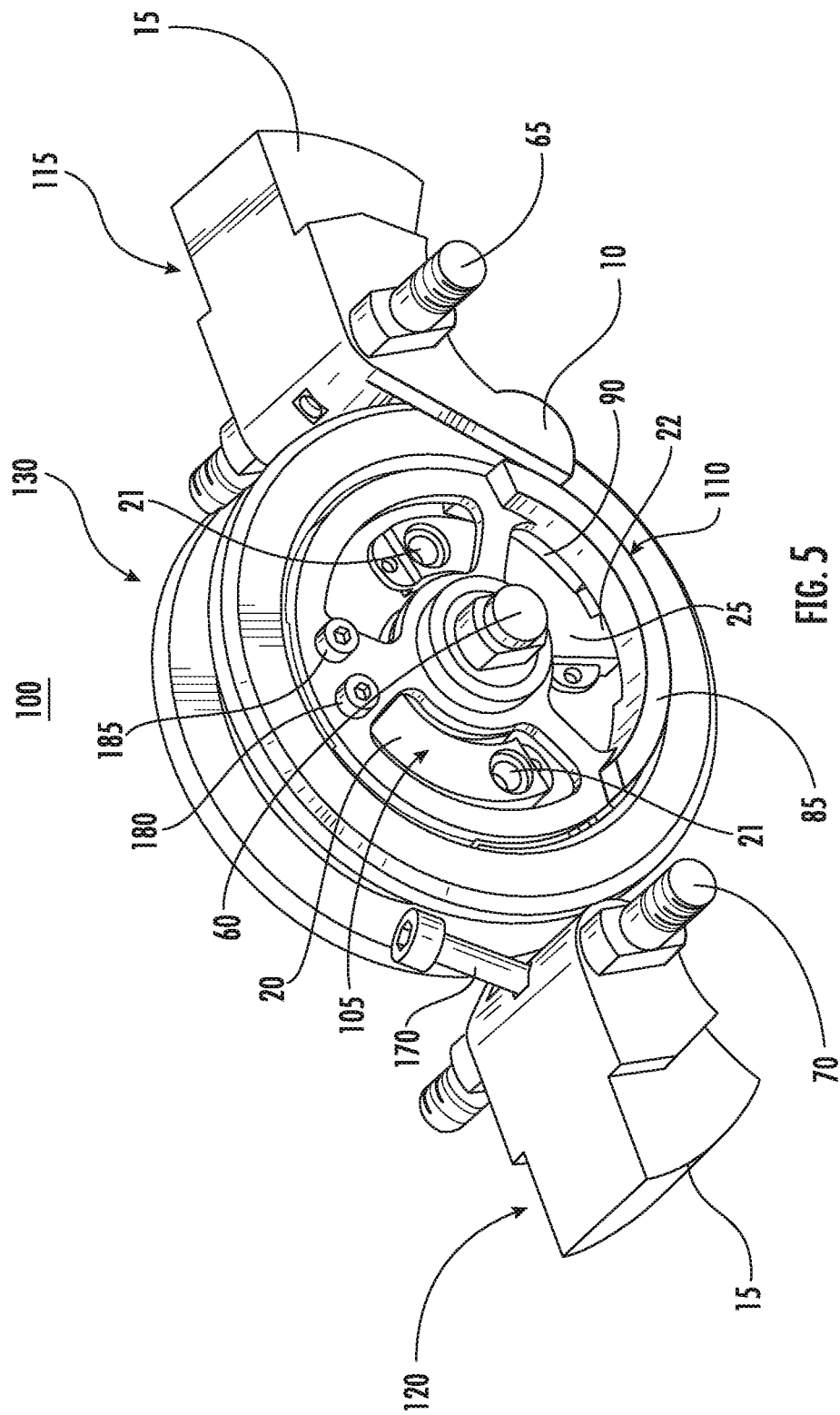
Figure 6:
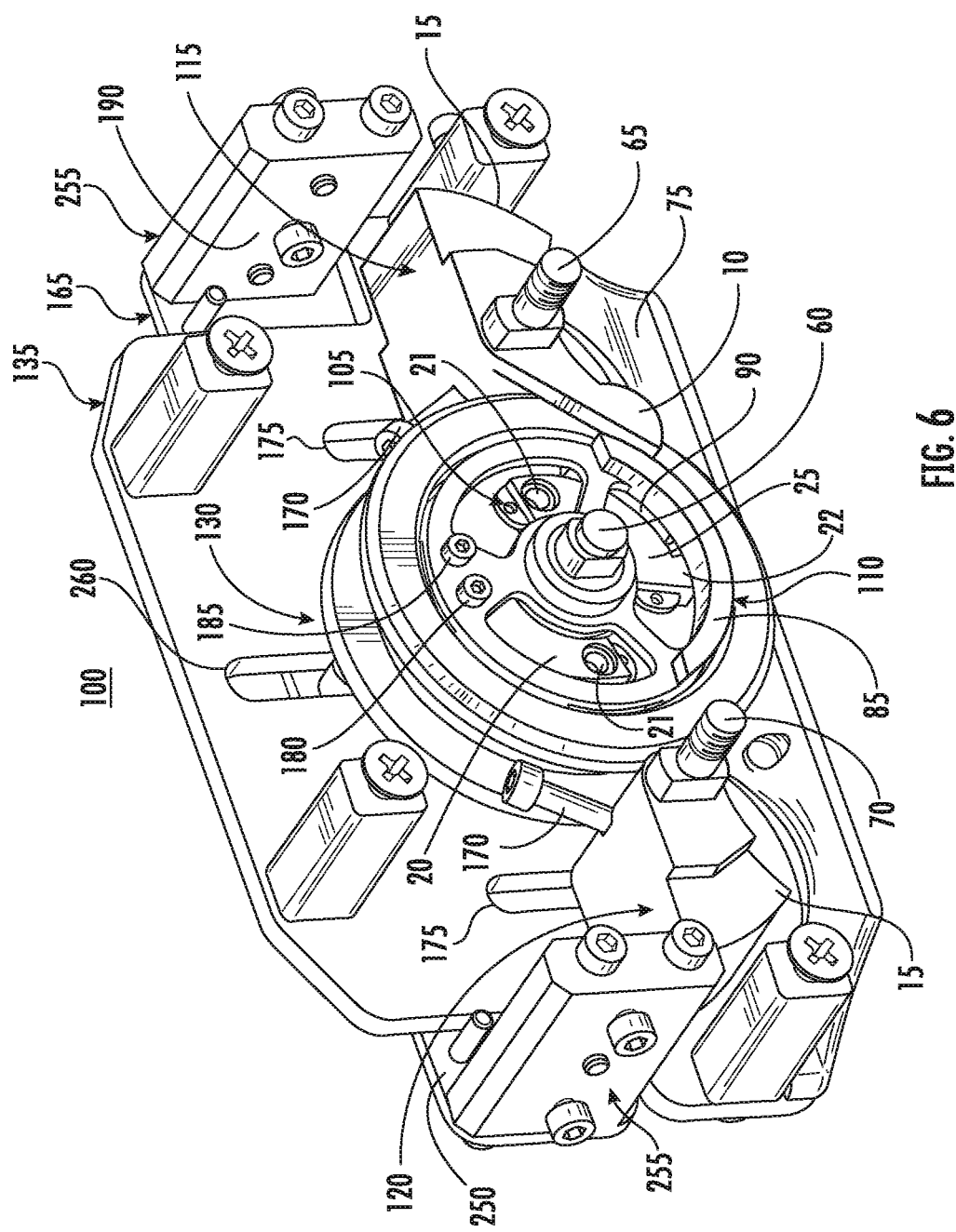
Figure 7:
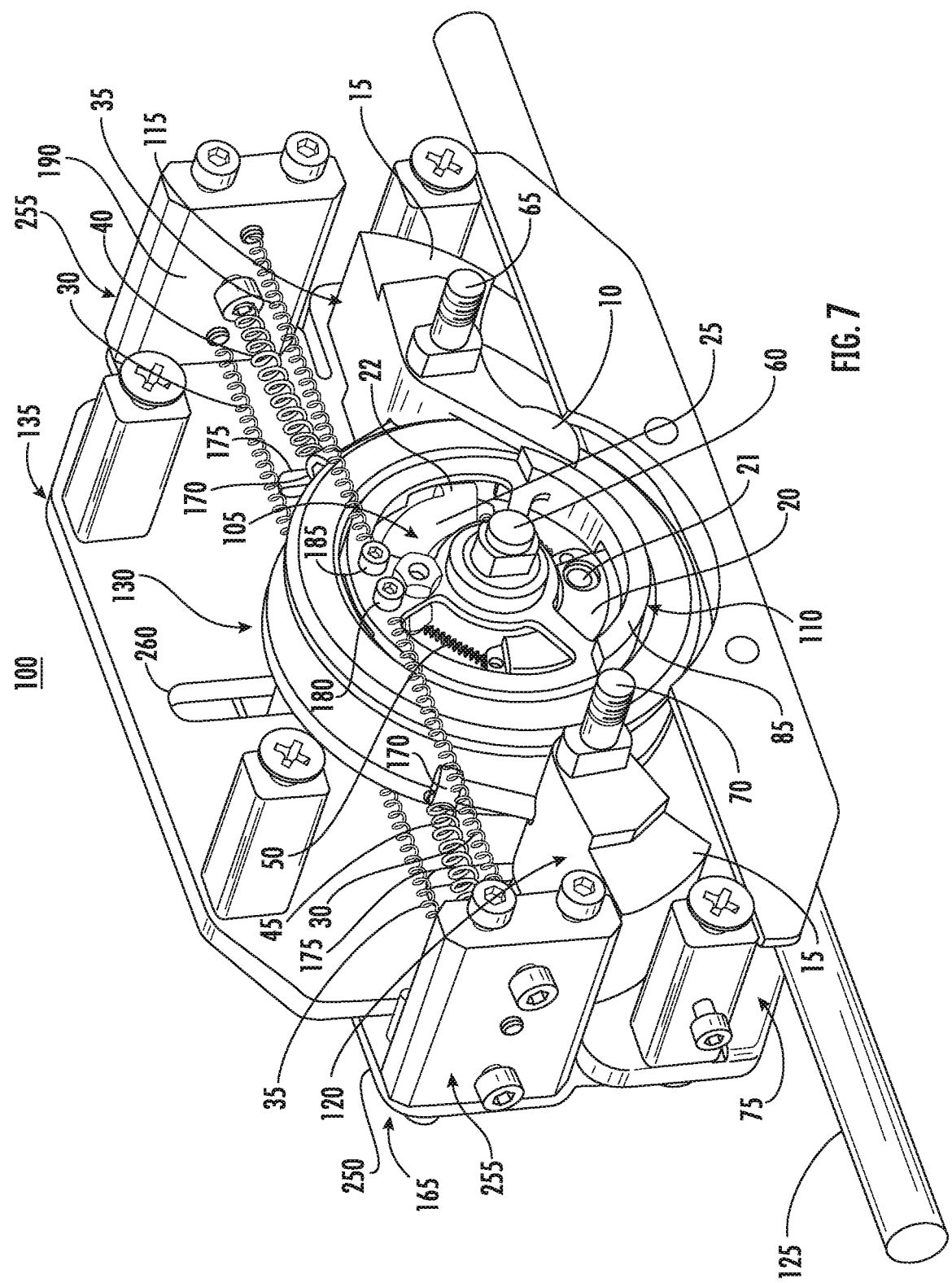
Figure 8:
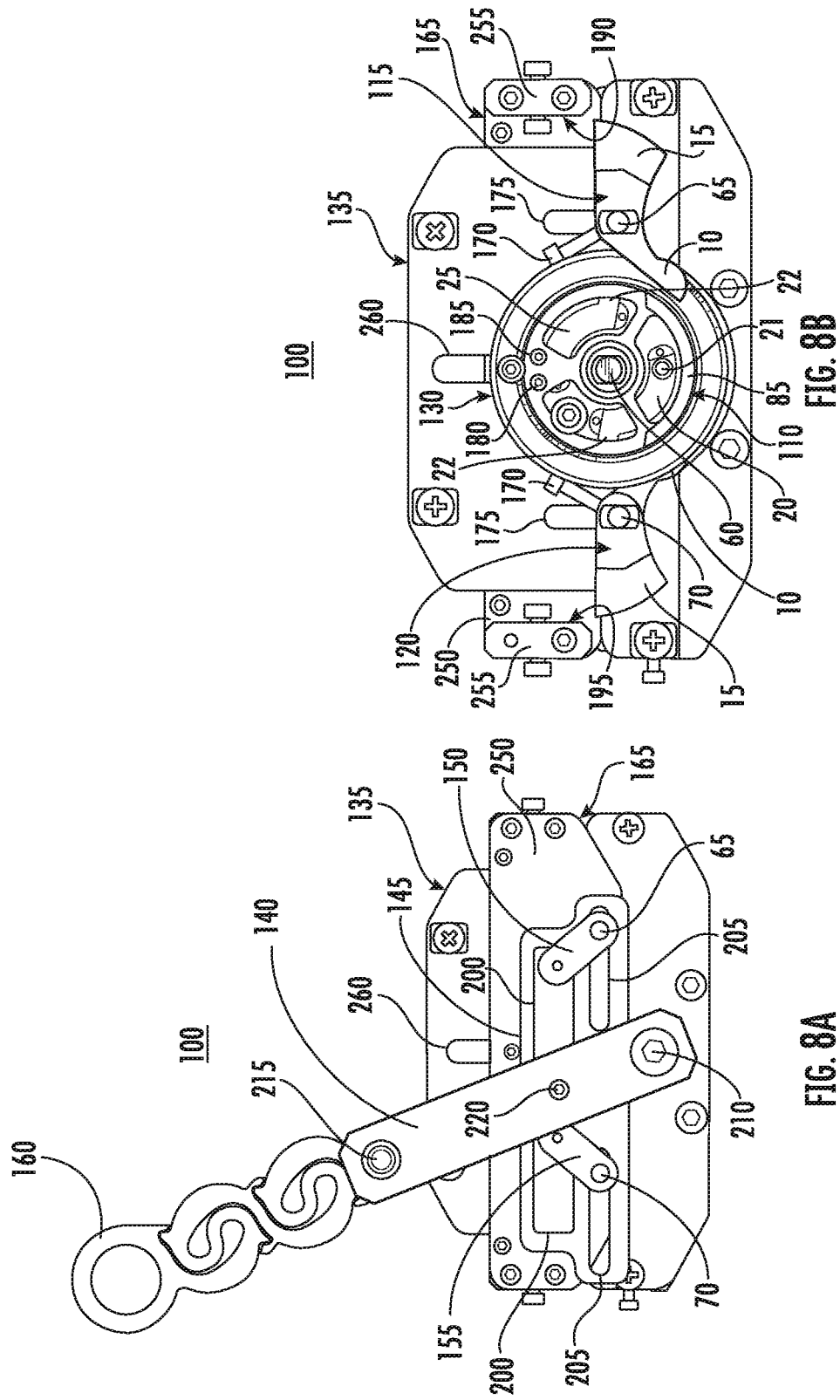
Figure 9:
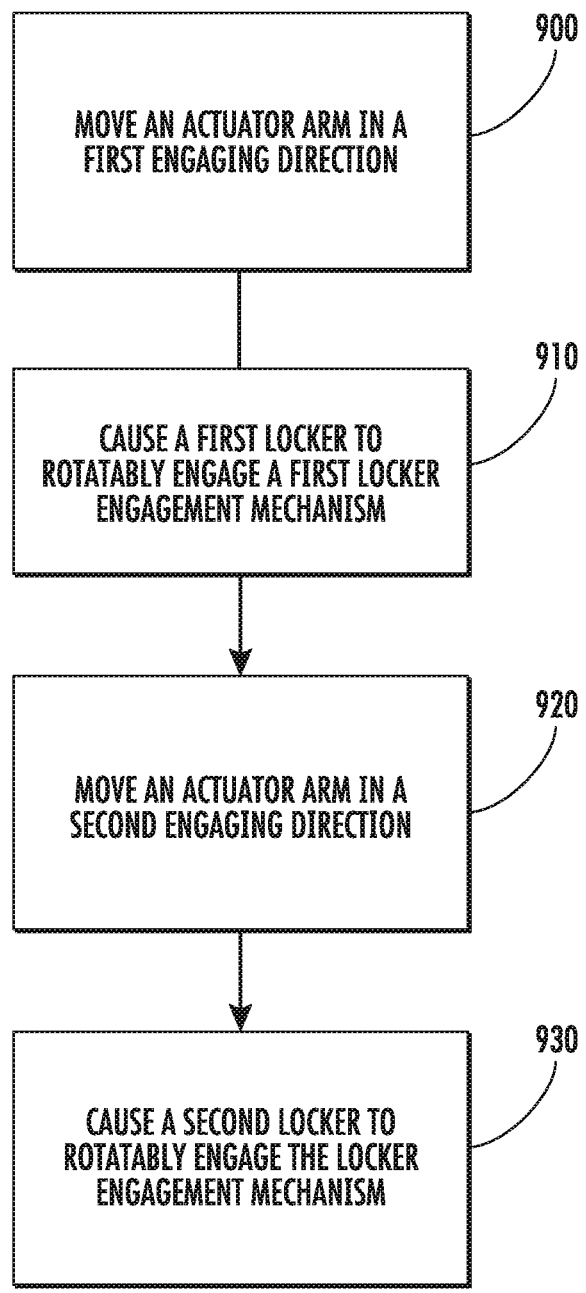
Figure 10A:
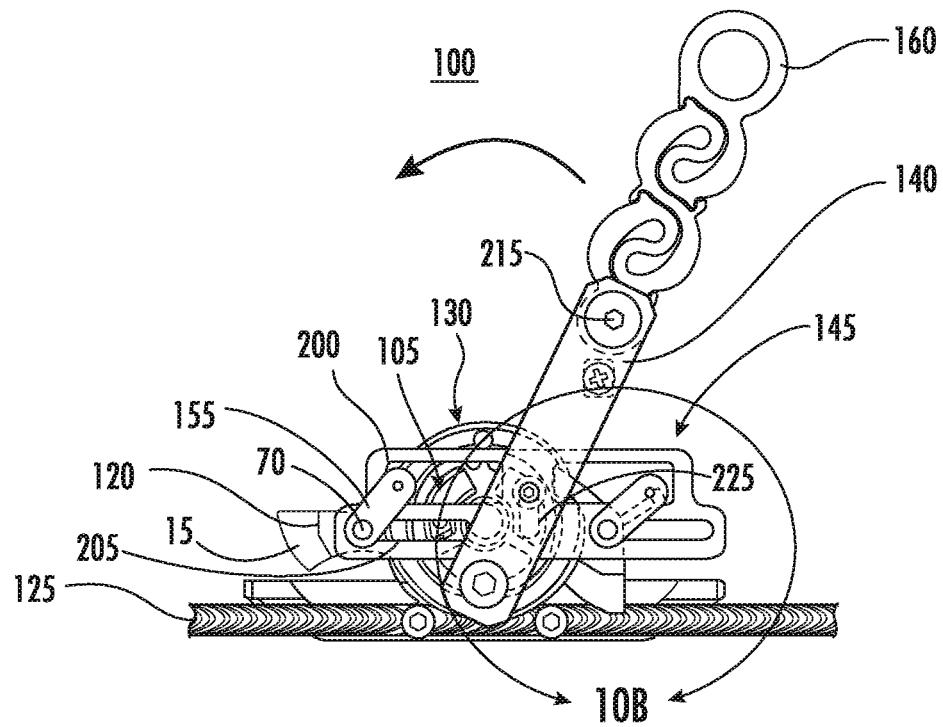
Figure 10B:
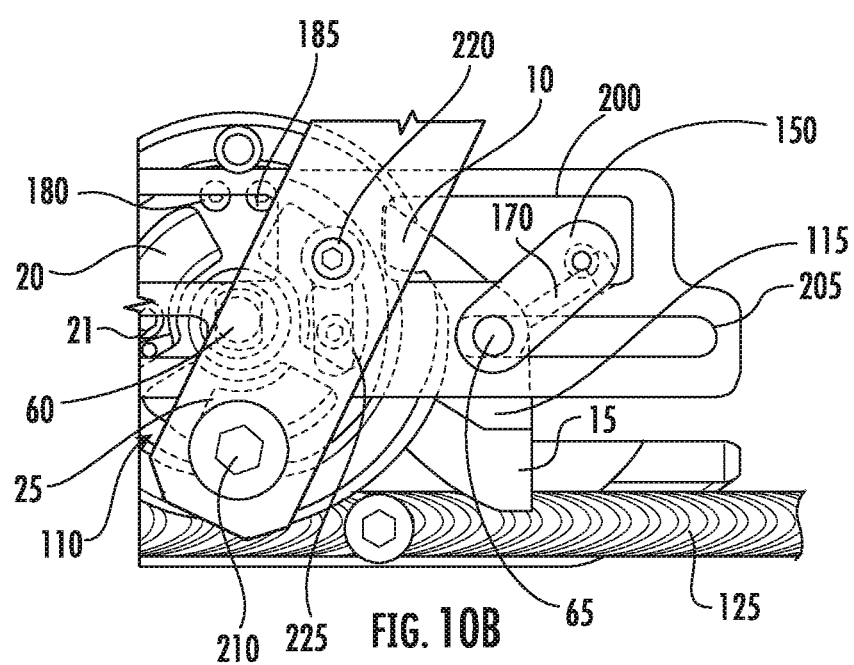
Figure 11A:
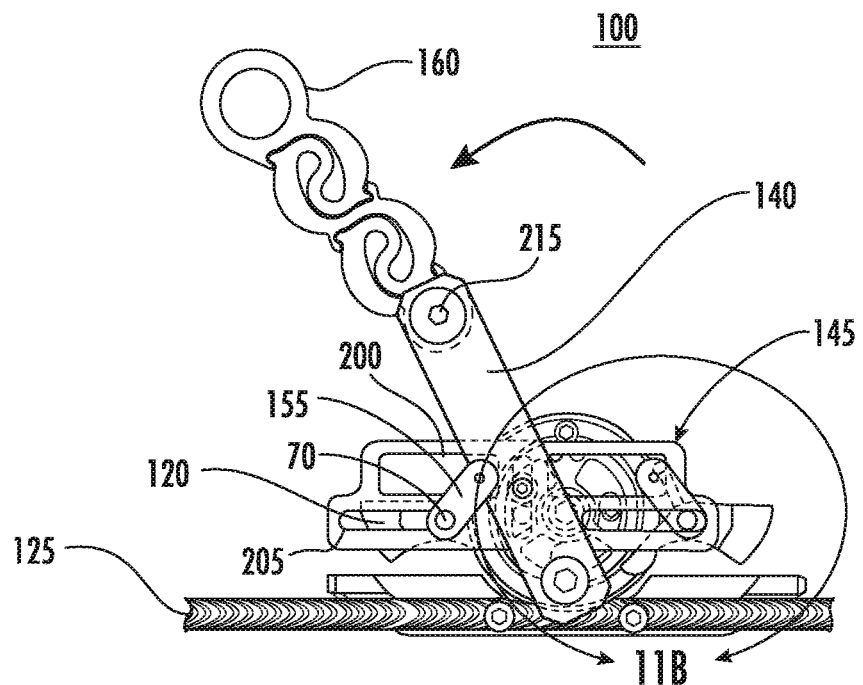
Figure 11B:
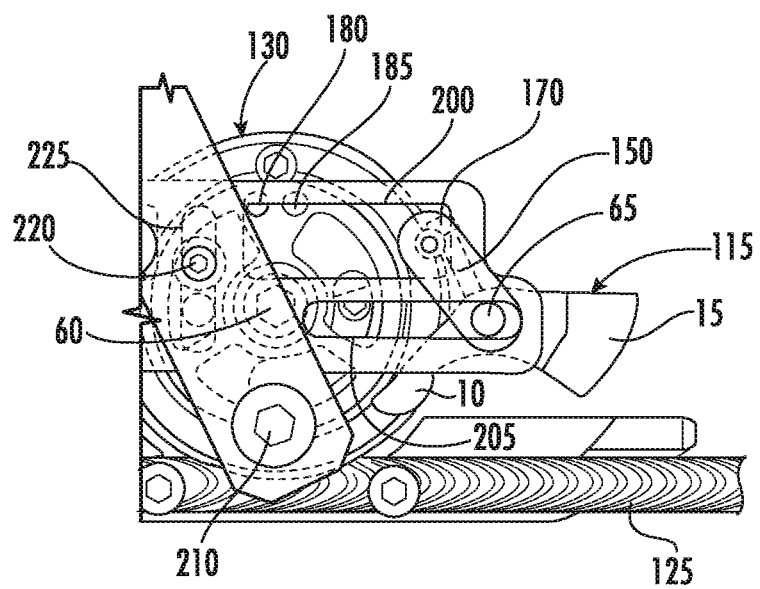
Figure 12:
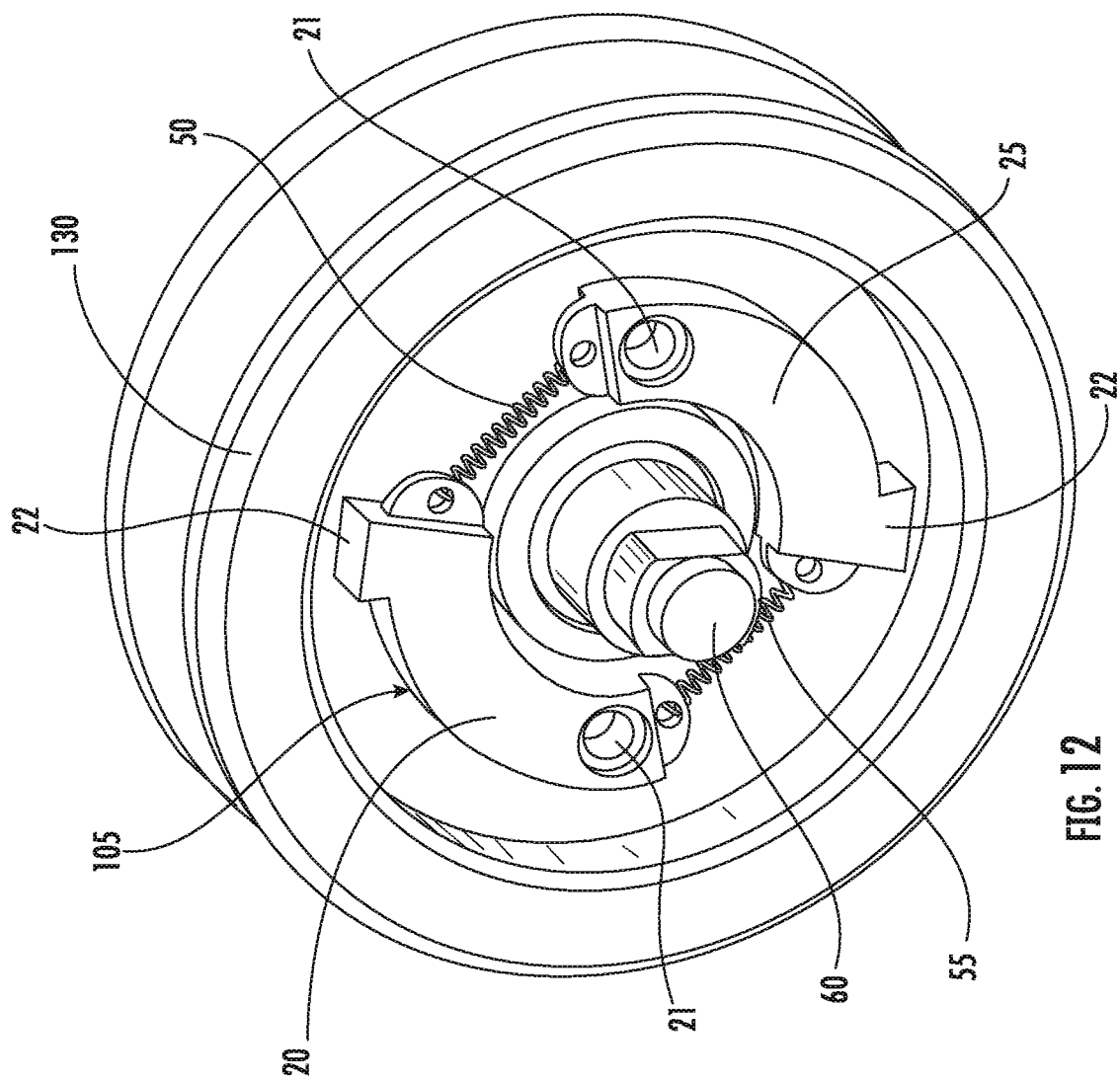
Figure 13B:
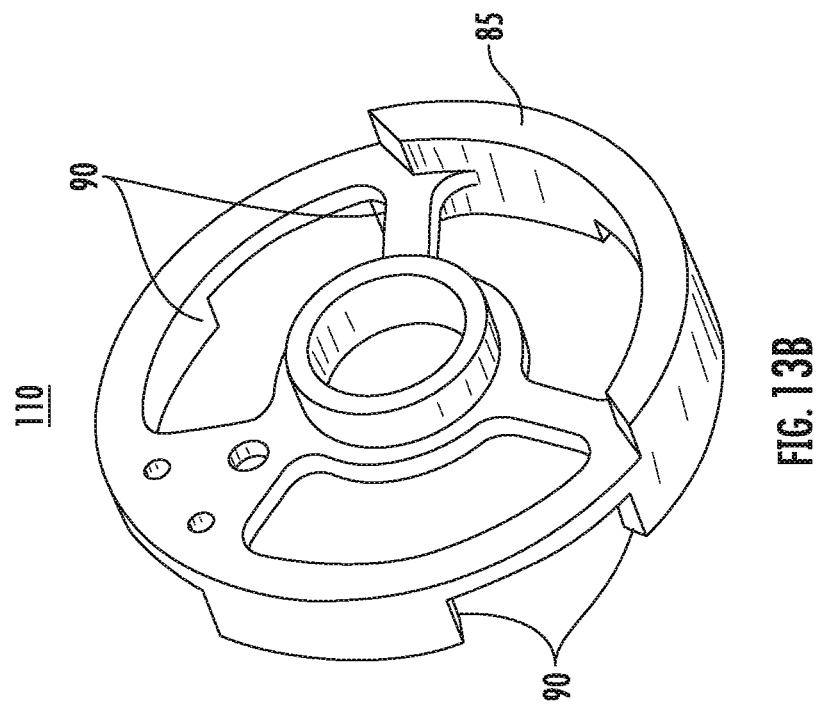
Figure 13A:
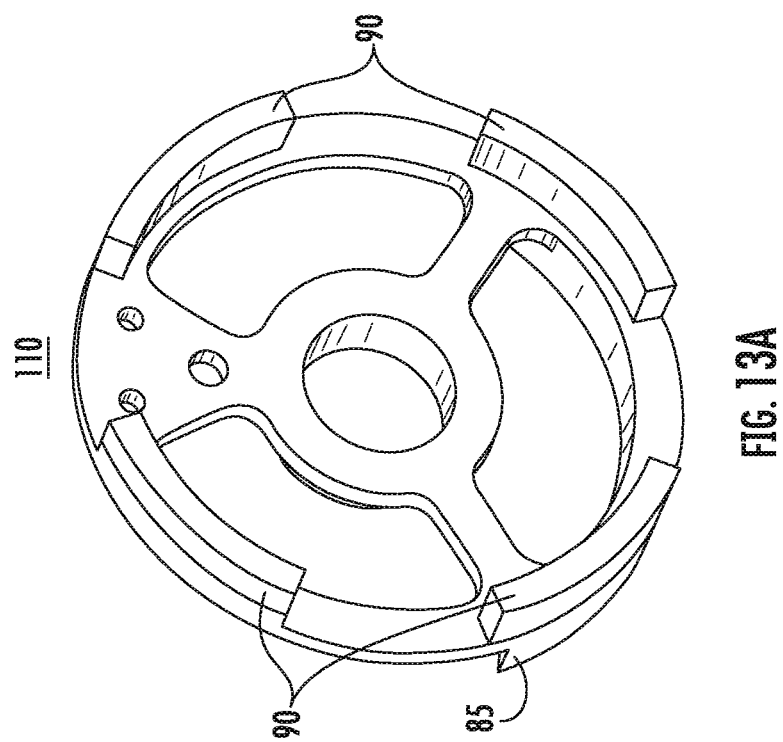
Figure 14:
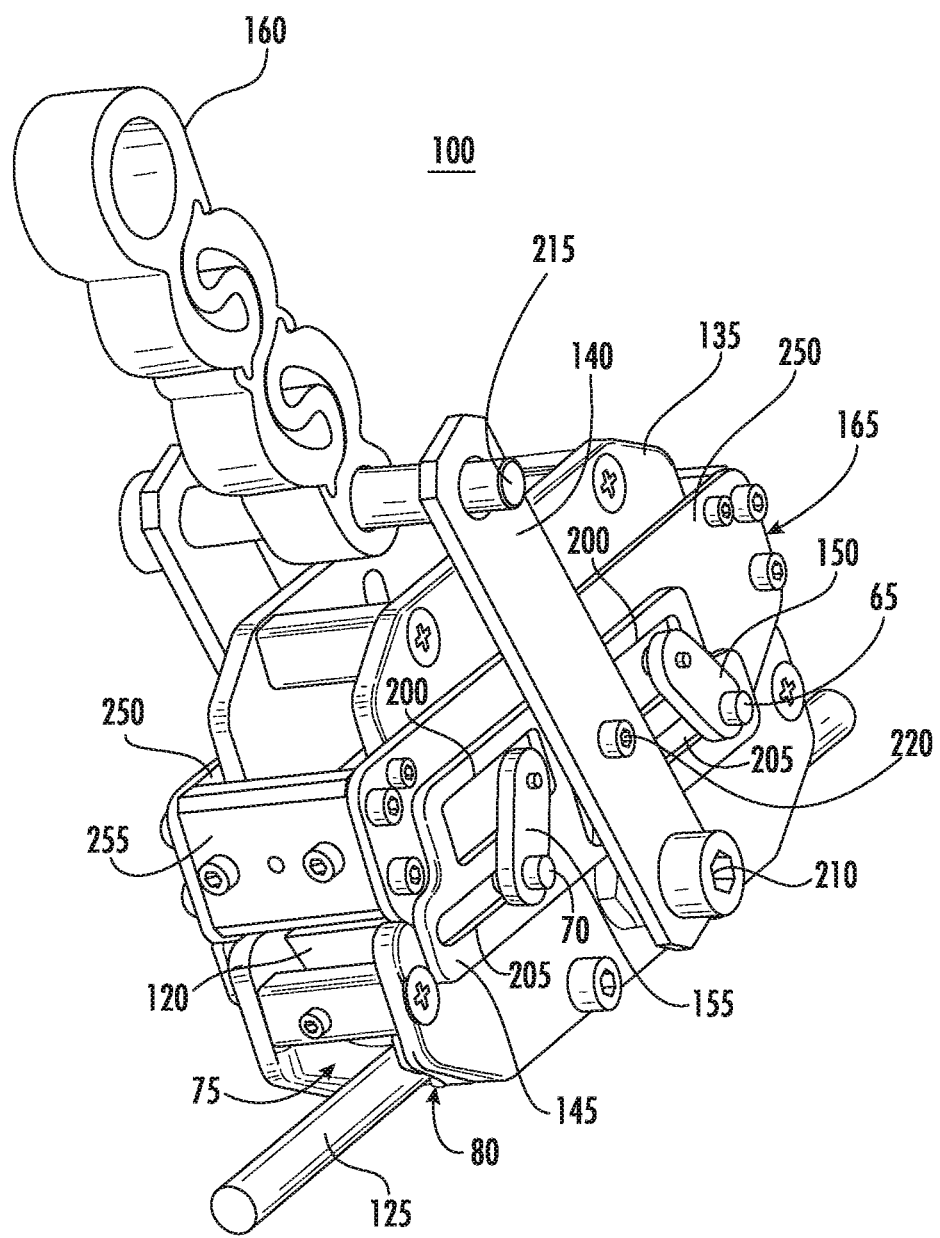

Having thus described certain example embodiments of the present disclosure in general terms, reference will here- inafter be made to the accompanying drawings, which are not necessarily drawn to scale, and wherein:

FIG. 1A is a partial view of an example embodiment of a protection device operating at a normal speed along a guide member in accordance with the present disclosure;

FIG. 1B is a close-up view of FIG. 1A illustrating the interaction between a locker and a locker engagement mechanism in accordance with the present disclosure;

FIG. 2A is a partial view of an example embodiment of a protection device, such as the one shown in FIG. 1, illustrating an example release of the locker when the wheel is at or above a first threshold speed along a guide member in accordance with the present disclosure;

FIG. 2B is a close-up of the locker engagement mechanism and the locker in accordance with FIG. 2A as the locker moves from position I to II in accordance with an example embodiment of the present disclosure;

FIG. 3 is a partial view of an example embodiment of a protection device, such as the one shown in FIG. 1, illustrating the locker engaged in a braking surface after being released by a locker engagement mechanism in accordance with the present disclosure;

FIG. 4 is a flowchart illustrating an example method of operating the locker system of the protection device in accordance with an example embodiment of the present disclosure;

FIG. 5 is a partial view of an example embodiment of a protection device configured for bi-directional braking operating at a normal speed along a guide member in accordance with the present disclosure;

FIG. 6 is a partial view of an example embodiment of a protection device configured for bi-directional braking positioned inside a portion of the housing in accordance with the present disclosure;

FIG. 7 is a more detailed partial view of an example embodiment of a protection device configured for bi-directional braking positioned inside a portion of the housing in accordance with the present disclosure;

FIG. 8A is an exterior view of a protection device including an actuator plate and actuator arm in accordance with the present disclosure;

FIG. 8B is an partial view of an example embodiment of a protection device configured for bi-directional braking positioned inside a portion of the housing in accordance with the present disclosure;

FIG. 9 is a flowchart illustrating the method of resetting one or more of the lockers with an actuator arm in accordance with an example embodiment of the present disclosure;

FIG. 10A illustrates an example embodiment of the protection device with the first locker engaged with the braking surface in accordance with the present disclosure;

FIG. 10B is a close-up view of the cutout shown in FIG. 10B illustrating the connection of the locker and the first locker actuator plate connector with the actuator plate and actuator arm in accordance with the present disclosure;

FIG. 11A illustrates an example embodiment of the protection device with the first locker engaged with the locker engagement mechanism in accordance with the present disclosure;

FIG. 11B is a close-up view of the cutout shown in FIG. 11B showing the movement of the actuator plate and first locker from FIG. 10B in accordance with the present disclosure;

FIG. 12 is an exposed view of a centrifugal actuator positioned concentrically with the wheel in accordance with an example embodiment of the present disclosure;

FIG. 13A illustrates a first side of a locker engagement mechanism embodied as a ring in accordance with an example embodiment of the present disclosure;

FIG. 13B illustrates a second side of a locker engagement mechanism, such as the one shown in FIG. 13A, embodied as a ring in accordance with an example embodiment of the present disclosure; and FIG. 14 is an exterior view of a protection device engaged with a portion of a guide member in accordance with an example embodiment of the present disclosure.

DETAILED DESCRIPTION

Some embodiments will now be described more fully hereinafter with reference to the accompanying drawings, in which some, but not all, embodiments are shown. Indeed, various embodiments may be embodied in many different forms and should not be construed as limited to the embodiments set forth herein; rather, these embodiments are provided so that this disclosure will satisfy applicable legal requirements. As discussed herein, the protection devices may be referred to use by humans, but may also be used to raise and lower objects unless otherwise noted.

The components illustrated in the figures represent components that may or may not be present in various embodiments of the invention described herein such that embodiments may include fewer or more components than those shown in the figures while not departing from the scope of the invention. Some components may be omitted from one or more figures or shown in dashed line for visibility of the underlying components.

The present disclosure provides various protection devices and the method of operating the like to provide sufficient braking force to a guide member. In some example, the protection device may be used for recreational climbing, powerline repair, object transportation and the like. Such applications often require free motion of the protection device at low speeds and protection for the user during high speeds. The present disclosure allows for a protection device to freely operate at lower speeds and provide a permanent braking to the protection device when a threshold speed is reached or exceeded in one or more directions. The threshold speed of the protection device 100 may be determined by the application of the protection device. For example, the desired threshold speed of a protection device 100 may be 6 kilometers per hour in one or more directions. A protection device of the present disclosure uses mechanical components during operation to provide a reliable protection device without complicated electronics. The configuration of the fall protection device, including the speed and direction at which the locker is released, may be fine-tuned based on the type and gauge of components (e.g., springs) selected for the protection device. The protection device of the present disclosure also allows for bi-directional braking, allowing the device to be used in various operations involving any orientation of the protection device, such as vertical, horizontal, and inclined operations without alteration. Example embodiments including bi-directional configurations allow the user to change between different applications, such as horizontal, vertical, or inclined, without having to remove and/or alter the protection device connection with the guide member. Moreover, the robust designs according to embodiments discussed herein enable a single device to be used for protection in any configuration involving a compatible guide member, rather than requiring multiple devices for different applications, which may be less cost effective and more dangerous.

In such embodiments, the reliability of the protection device is higher than in the prior art as the protection device does not have to be removed from a cable, which can create problems related to installation.

Referring now to FIG. 1A, a portion of a protection device for navigating a guide member 125 (e.g., a cable) is provided. As shown in FIG. 14, the protection device 100 may have a housing 135 and a braking mechanism frame 165. In some embodiments, the housing 135 may include one or more guide surfaces 75, 80 that surrounds a portion of the guide member on which the protection device 100 is navigating. In some embodiments, the wheel may be rotatably attached to the housing 135 at least on one side of the wheel (e.g., along the first axis 60). In such embodiments, the wheel may be at least partially exposed. In some embodiments, the housing 135 may encapsulate the wheel. In such embodiments, the wheel may be rotatably attached to the housing at both sides of the first axis 60. In some embodiment, the axis 60 may define an axle having a keyed hub to rotationally lock the axle relative to the housing, while the wheel 130 is permitted to rotate thereabout. In some embodiments, the housing 135 may, in combination with any braking mechanism frames 165, provide protection for the wheel, locker(s), centrifugal actuator(s), and/or locker engagement mechanism(s).

In some embodiments, a wheel 130 is provided to engage with the guide member 125. In some embodiments, the wheel 130 is rotatable around a first axis 60. In various embodiments, the wheel 130 may be different sizes based on the application of a given protection device 100. For example, the wheel may have a diameter of 50 millimeters. In some embodiments, the wheel 130 may have a larger diameter to increase stability of the protection device. In some embodiments, the wheel 130 may have a smaller diameter to allow for a more compact and lighter overall protection device. The wheel 130 may be rotate along a guide member, such as a cable, wire, rope, or the like. In some embodiments, the wheel may define a groove to engage the guide member. Alternatively, the wheel 130 may have a flat exterior that is held in contact with the guide member through friction or by exterior force (e.g., the housing 135 may hold the guide member and wheel together during operation).

In some embodiments, a larger amount of friction between the wheel and the guide member may be preferred. In some embodiments, the wheel 130 may be made of a nickel alloy, which may enforce friction between the guide member and wheel. For example, with reference to FIGS. 6-8B, the housing 135 may include one or more guide surfaces 75, 80 configured to at least partially surround and capture the guide member 125 between the guide surfaces and the wheel to hold the protection device 100 on the guide member.

With reference to FIGS. 6-8b, in some embodiments, a braking mechanism frame 165 may be provided. The braking mechanism frame 165 may be movably be attached to the housing 135, such that the braking mechanism frame 165 is configured to move vertically (e.g., up and/or down) relative to the housing in the depicted orientation (e.g., through slots, such as slot 260, in the housing), although it should be understood that "vertically" may refer to any absolute direction depending upon the angle of the assembly. In some embodiments, the braking mechanism frame 165 may be movably attached to the actuator plate 145 such that the braking mechanism frame 165 and the actuator plate 145 are configured to move laterally (e.g., left and/or right) relative to each other, although it should be understood that "laterally" may refer to any absolute direction depending upon the angle of the assembly. The braking mechanism frame 165 may include two plates 250 on each side of the wheel 130 attached to one another with two or more frame connectors 255. In some embodiments, braking mechanism frame 165 may define a first spring attachment surface 190 on a first frame connector and a second spring attachment surface 195 on a second frame connector, the first and second frame connects being on opposite sides of the braking mechanism frame 165 configured to attach one or more springs to each respective spring attachment surface. As discussed in more detail below in relation to FIG. 7, a locker engagement mechanism 110 may have two locker engagement mechanism springs 30, 35 attached at one end to a respective locker engagement mechanism spring screw 180, 185 and at a second end to a respective spring attachment surface 190, 195 (e.g., in the embodiment shown in FIG. 7, one or more of the second locker engagement mechanism springs 35 is attached to the second locker engagement spring screw 185 at one end and the second spring attachment surface 195 at the other end). Additionally, the locker springs 40, 45 discussed below may also be attached to a respective spring attachment surface 190, 195 of the frame connectors 255.

In various embodiments, the protection device 100 may have a centrifugal actuator 105. In some embodiments, the centrifugal actuator 105 may be located within the wheel. In an example embodiment, with reference to FIG. 12, the centrifugal actuator 105 may be spring-biased to rotate based on the speed of the wheel 130. In such embodiments, the amount of spring bias may affect the threshold speed at which the centrifugal actuator 105 rotates causing the locker engagement mechanism 110 to release the locker 115. In some embodiments, the speed of the wheel at which the centrifugal actuator is engaged is based on the application being used. For example, in some applications, such as for human fall protection, the rate of speed allowed may be less than for other objects. The centrifugal actuator 105 may be configured to adjust the speed at which the wheel engages the centrifugal actuator 105 based on the springs used in the centrifugal actuator. The centrifugal actuator 105 may be rotationally affixed to the wheel via one or more screws, pins, or other attachment means. For example, one or both of the centrifugal component arms 20, 25 may have a centrifugal coupling point 21, as shown in FIG. 12, configured to allow the centrifugal actuator 105 to be attached to the wheel 130. In some embodiments, the centrifugal actuator may include a pair of centrifugal component arms 20, 25 and a pair of centrifugal actuator springs 50, 55 that are configured to resist expansion of the centrifugal component arms 20, 25, such that the centrifugal component arms do not engage the locker engagement mechanism 110 until the wheel 130 is at or above a certain speed. For example, the centrifugal actuator 105 may be configured such that the centrifugal actuator springs 50, 55 provide a resistance to the expansion of the centrifugal component arms, such that the centrifugal component arms expand to engage with a locker engagement mechanism at or above a threshold speed. In some embodiments, the centrifugal component arms 20, 25 may each have an actuating protrusion 22, which may extend radially outwardly. In an example embodiment, the actuating protrusion 22 may be positioned at a distance away from the centrifugal coupling point 21, such that as the wheel speed increases in a particular direction, one or both of the centrifugal component arms 20, 25 may rotate about the respective centrifugal coupling point 21 moving the respective actuating protrusion 22 outwardly until the respective actuating protrusion engages with the associated locker engagement mechanism.

In various embodiments, a locker engagement mechanism 110 may be configured to engage with the centrifugal actuator 105 to control the braking operations discussed herein. In some embodiments, the locker engagement mechanism 110 may be actuated by the centrifugal actuator 105 at or above a certain speed of the wheel in one or more directions. For example, at or above a certain speed of the wheel 130 in one or more directions, the centrifugal actuator 105 may be cause the locker engagement mechanism 110 to rotate when the actuating protrusion 22 moves outwardly sufficiently to engage with the locker engagement mechanism. In various embodiments, the locker engagement mechanism 110 may be engageable with the centrifugal actuator 105, such that when the centrifugal actuator is rotated based on the speed of the wheel, the locker engagement mechanism is actuated and rotated. In some embodiments, the locker engagement mechanism 110 may be configured to restrict the rotation of a locker 115 around the second axis 65, depending upon the braking condition of the protection device. As discussed below in relation to FIG. 7, the locker engagement mechanism may be spring biased, such that motion is restricted even during the actuation of the centrifugal actuator 105.

As shown in FIGS. 13A and 13B, the locker engagement mechanism 110 may be a ring configured to rotate concentrically with the wheel about the first axis 60. In some embodiment, the ring may be engageable with the centrifugal actuator on an interior side and engageable with a locker on an exterior side, such that the locker engagement mechanism may rotate when engaged by the centrifugal actuator 105. In some embodiments, the ring may have one or more interior protrusions 90 on the interior side of the ring and/or one or more exterior protrusions on the exterior side of the ring (e.g., the exterior protrusions of the exterior side of the ring may be the engagement member 85 of a given locker engagement mechanism). In some embodiments, the exterior protrusions may be engaged with the locker holder mechanism 10 of a locker 115, 120, such that the rotational movement of the locker is restricted by the exterior protrusion. In some embodiments, the one or more interior protrusions 90 of the ring may be disposed in the same plane as and may be configured to engage with the actuating protrusions 22 of the centrifugal actuator 105, such that the centrifugal actuator causes the locker engagement mechanism 110 to rotate about the first axis 60. In some embodiments, in an instance when a locker and the ring are engaged, at or above a threshold wheel speed in a certain direction, the centrifugal actuator 105 may engage the ring causing the ring to release the locker 115, 120, such that the locker is allowed to rotate. Each side of the wheel may include substantially the same mechanism in some embodiments.

Figure 2:
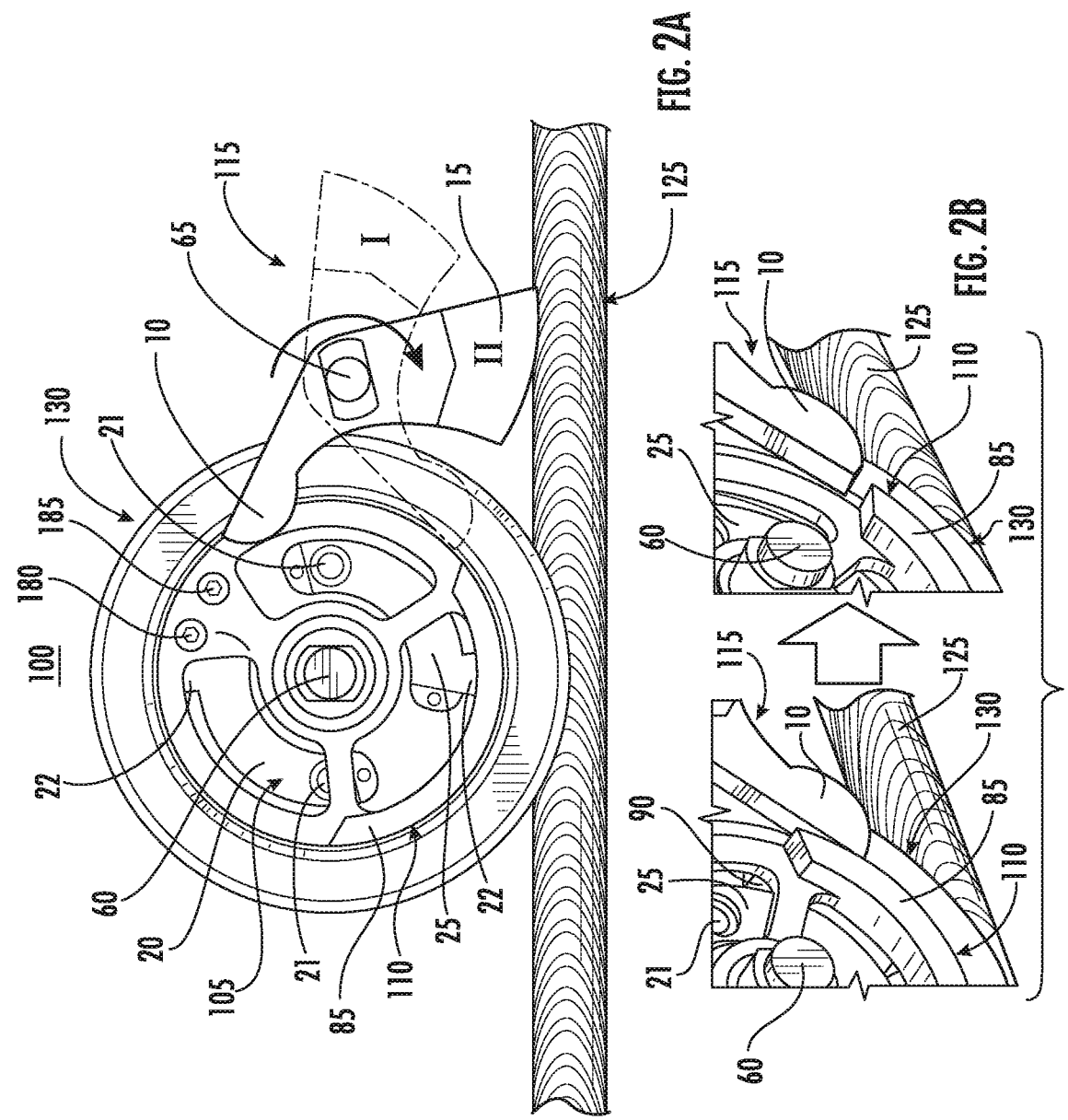

In some embodiments, the locker engagement mechanism 110 may have an engagement member 85 configured to engage the locker 115 to restrict the rotation of the locker 115. In an example embodiment, the engagement member 85 of the locker engagement mechanism may be an exterior protrusion, as described above, provided along a circumferential edge of the locker engagement mechanism. In such an embodiment, as shown in FIG. 2, the locker engagement mechanism 110 may define a ring shape that is concentric with the wheel on which the protrusion is located. As shown, when the locker is engaged in an operational (e.g., non-braking) position, a locker holder mechanism 10 of the locker 115 is in forcible communication with the underside of the engagement member 85 (e.g., a protrusion) of the locker engagement mechanism 110 to prevent rotation of the locker 115 as described herein. The underside of the engagement member 85 may define an arcuate surface having a constant radial distance from the axis 60.

Turning to FIGS. 1A-3, the wheel 130, locker engagement mechanism 110, centrifugal actuator 105, locker 115, and guide member 125 are shown in isolation to demonstrate the operation and release of the locker to cause the protection device to brake. As shown in FIGS. 1A-1B, the locker 115 may be configured around the second axis 65, such that the locker 115 may rotatably engage the braking surface (e.g., a surface of the guide member 125). As shown in FIG. 7, the locker 115 may be rotatably attached to the housing 135 about the second axis 65 and a spring 40 may continually apply a rotational force to the locker 115 towards the braking position (e.g., a clockwise force for the right locker 115 and a counter-clockwise force for the left locker 120 shown relative to the view of FIG. 7). With reference to FIG. 1B, the locker 115 may have a locker holder mechanism 10 and a braking surface engagement mechanism 15. For example, the locker holder mechanism 10 may be an arm extending from the second axis 65 to allow the locker 115 to engage the locker engagement mechanism 110, and the braking surface engagement mechanism 15 may be a pawl that is configured to engage the braking surface (e.g., an upper surface of a cable) to brake the protection device. In some embodiments, the locker holder mechanism 10 and the braking surface engagement mechanism may be an integral piece. Alternatively, the locker holder mechanism 10 and the braking surface engagement mechanism may be separately pieces formed together (e.g., such as welding).

In some embodiments, the locker holder mechanism 10 and the braking surface engagement mechanism 15 may be configured such that when the locker holder mechanism 10 is engaged by a locker engagement mechanism 110, the braking surface engagement mechanism 15 is not in contact with the braking surface. In some embodiments, the locker holder mechanism 10 may be configured such that when the locker holder mechanism 10 is engaged with the locker engagement mechanism 110 in a non-braking configuration, the braking surface engagement mechanism 15 is not in contact with the braking surface (e.g., the guide member 125). In various embodiments, the braking surface engagement mechanism 15 may be configured to engage the braking surface to sufficiently stop the motion of the protection device. In some embodiments, the braking surface engagement mechanism 15 may be a sufficient size to completely stop the motion of the protection device 100 when the braking surface engagement mechanism 15 engages the guide member 125. The braking surface engagement mechanism 15 may define an arcuate end with a varying radius configured to engage the guide member, and a radius of the braking surface engagement mechanism (e.g., a distance from the axis 65 to the surface at the end of the braking surface engagement mechanism) may increase circumferentially relative to the axis 65, such that the initial contact point between the braking surface and the braking surface engagement mechanism is at an area of lower radius and a final resting position (e.g., the position shown in FIGS. 10A-10B) is at an area of higher radius and increased braking force. In some embodiments, the varying radius of the braking surface engagement mechanism 15 may cause the braking force to increase over time during deployment of the brake until the braking surface engagement mechanism comes to rest at a position of maximum braking force to stop the wheel (e.g., the position shown in FIGS. 10A-10B). In the embodiments depicted in the figures, the size and shape of the lockers 115, 120, including the braking surface engagement mechanism 15, and their interaction with the remaining assembly components may be configured to facilitate braking in this manner.

In various embodiments, the braking surface may include a wire, cable, rope, or the like. The braking surface engagement mechanism 15 may be made out of steel (e.g., stainless steel), other metals, or the like. In some embodiments, the material selected for the first locker 115 and/or second locker 120 may be based on maximizing the coefficient of friction between the first locker 115 or second locker 120 and the braking surface (e.g., the surface of the guide member 125). In some embodiments, the environment of use may affect the material used for the first locker 115 and/or second locker 120. For example, stainless steel may be used in outdoor applications.

Referring now to FIGS. 2A and 2B, the releasing progression of the locker 115 is illustrated in accordance with an example embodiment of the present disclosure. In an example embodiment, as the wheel 130 travels along the guide member 125, when the speed of the wheel is at or above a first threshold speed, the arms of the centrifugal actuator 105 will expand outwardly until the pawls engage the locker engagement mechanism 110. In the depicted embodiment, the rotation of the wheel 130 and centrifugal actuator 105 after engagement with the locker engagement mechanism 110 causes the locker engagement mechanism to rotate with the wheel, which releases the locker 115 to rotate about the second axis 65 under the force of the spring to engage with the braking surface.

As shown in FIG. 2A, in an instance when the protection device 100 is travelling at or above a threshold speed in a first direction, the centrifugal actuator 105 rotates the locker engagement mechanism 110 to release the locker 115. For example, as shown, the locker engagement mechanism 110 may rotate clockwise to release the locker holder mechanism 10 of the locker 115. In an example embodiment, when the locker 115 is in a first position (Position I in FIG. 2A), the braking surface engagement mechanism 15 is not in contact with the braking surface and the locker 115 is restricted from rotating by the locker engagement mechanism 110 being in contact with the locker holder mechanism 10. In such an example, as the locker 115 is released by the locker engagement mechanism 110, the locker 115 may rotate around the second axis 65 to a braking position (Position II in FIG. 2A) and the braking surface engagement mechanism 15 may contact the braking surface (e.g., the cable 125). In some embodiments, the braking surface may be a surface of the wheel. For example, the locker may be configured to engage with the wheel 130 when released by the locker engagement mechanism and the friction between the wheel and the cable may stop the protection device motion. As shown in more detail in FIG. 2B, as the locker engagement mechanism 110 rotates, the engagement member (e.g., a protrusion as shown in FIG. 2B) may rotate such that the locker holder mechanism 10 and the engagement member are no longer in forcible communication allowing the locker to rotate from position I to position II. One skilled in the art would understand, in light of the present disclosure, that slight changes may be made to the locker 115 based on the type of guide member 125 used.

Referring now to FIG. 3, the locker 115 in accordance with an example embodiment is shown after being released by the locker engagement mechanism 110 and being engaged with the guide member 125. As discussed in relation to FIGS. 2A-2B, the locker 115 may be configured, when released by the locker engagement mechanism 110, to rotate around the second axis to engage the braking surface. In an example embodiment, a braking surface engagement mechanism 15 of the locker 115 engaged with the guide member 125, such as the cable. As shown in FIGS. 1A-1B, when the wheel 130 is below a threshold speed, the locker remains engagement with locker engagement mechanism 110 and does not inhibit the motion of the wheel. In various embodiments, as the locker is released, the locker may remain released and engaged in the guide member until the locker 115 is reset, such as discussed in FIG. 9. In some embodiments, after one of the lockers 115, 120 has been released by a locker engagement mechanism 110, a locker engagement mechanism stop may contact the locker engagement mechanism to limit further rotation of the locker engagement mechanism 110. In some embodiments, stopping the rotation of the locker engagement mechanism 110 may cause the wheel 130 to slip on the guide member 125. For example, the locker engagement mechanism stop may be configured to engage when the locker engagement mechanism 110 has rotated in either direction by 20 to 30 degrees (e.g., the locker engagement mechanism may be limited to a total rotational range of 40 to 60 degrees centered about vertical).

In the example embodiment depicted in FIGS. 1A-3, the wheel may only trigger the locker 115 when rotating clockwise because rotating the locker engagement mechanism 110 counter clockwise would move the engagement member higher up onto the locker 115 rather than releasing the locker. The engagement member of the locker engagement mechanism 110 may be sufficiently long (e.g., extending 120 degrees about the locker engagement mechanism) that the locker does not release when rotating in one direction (e.g., rotating counter-clockwise relative to the locker and positions shown in FIGS. 1A-3). In some embodiments, the locker 115 is configured to apply a braking force in one direction of motion. For example, in the position shown in FIG. 3, movement of the protection device left-to-right relative to the guide member 125 (e.g., cable) causes the locker 115 to bite down into the cable while applying an upward force on the protection device (e.g., to squeeze the cable between the braking surface engagement mechanism 15 of the locker and the one or more guide surfaces of the housing (shown in FIG. 7)). Movement of the depicted protection device right-to-left relative to the guide member 125 would cause the locker to be rotated counter-clockwise to lessen the pressure on the guide member. As described herein, the protection device according to some embodiments discussed herein thereby uses two lockers on opposite sides of the wheel 130 to cause braking in both directions within the same assembly.

Referring now to FIG. 4, a flowchart illustrating the method of operation for a protection device in accordance with the present disclosure is provided. The flowchart illustrates example operations in which one or more lockers are engaged with a braking surface based on the speed of the wheel 130. In some embodiments, the protection device 100 may be configured with one locker, such that the protection device 100 may only be configured to carry out Blocks 400 through 430 and not Blocks 440 through 460. In some embodiments, when the first locker 115 or the second locker 120 is released and engages a braking surface, the protection device will stop such that the other locker will remain engaged with the locker engagement mechanism associated with such locker.

Referring now to Block 400 of FIG. 4, the method of operating the protection device for navigating the guide member includes engaging a wheel 130 with the guide member. The wheel 130 is configured such that the wheel may freely rotate along a guide member at a certain range of speeds. In some embodiments, the protection device 100 may be configured to employ a braking device (e.g., lockers 115, 120) in one or both directions of operation. In an example embodiment, one locker 115 of the protection device 100 may be configured as shown in FIGS. 1-3 and Blocks 410 through 430 of FIG. 4, such that the locker engages a braking surface when the wheel is at or above a threshold speed in the first direction. In some embodiments with two lockers, the protection device 100 may include a second locker, such as the locker 120, shown and described in FIGS. 4-8. The lockers may be configured to respectively deploy to brake the protection device in an instance where the wheel is rotating at or above a first threshold speed in a first direction and a second threshold speed in a second direction. Unless otherwise noted, the first locker 115 and the second locker 120 may operate using identical structures disposed on opposite sides of the wheel 130 (e.g., the operation of the second locker 120 in FIGS. 5-8 is identical to the operation of locker 115 in FIGS. 1A-3).

Referring now to Block 410 of FIG. 4, in an instance when the wheel speed is at or above a first threshold speed in a first direction, the method of operating the protection device for navigating the guide member 125 includes engaging and rotating a centrifugal actuator 105 operatively coupled with the wheel 130. As shown in FIG. 7, the centrifugal actuator may include a plurality of centrifugal component arms (e.g., arms 20, 25). In some embodiments, the centrifugal component arms 20, 25 may be attached to one another by one or more springs (e.g., centrifugal springs 50, 55). The centrifugal springs 50, 55 may be selected based on the wheel speed desired. In an example embodiment, as the wheel spins faster, the centrifugal components begin to move with the centrifugal springs configured to restrict the rotation of the centrifugal actuator 105. As discussed above in more detail in reference to FIG. 12, in some embodiments, the centrifugal component arms 20, 25 may be configured with actuating protrusions configured to engage with a locker engagement mechanism 110 at or above a certain speed in one or more directions. One skilled in the art would understand other methods of centrifugal rotation possible to be used in the protection device 100.

Referring now to Block 420 of FIG. 4, the method of operating the protection device for navigating the guide member 125 includes actuating a locker engagement mechanism 110 with the centrifugal actuator 105 to release a first locker 115 (e.g., allowing the centrifugal actuator 105 to expand into engagement with the locker engagement mechanism 110 to rotate the locker engagement mechanism about the axis 60). In some embodiments, the first locker 115 may be released when the wheel 130 speed is at or above the first threshold speed in the first direction. In some embodiments, the first locker 115 may remain engaged when the wheel speed in the first direction is below the first threshold speed and anytime the wheel is moving in a second, opposite direction. In some embodiments, such as shown in FIG. 7, locker engagement mechanism springs 30, 35 may be provided with one end attached to one of the first or second spring attachment surfaces 190, 195 of the braking mechanism frame 165 and the other end attached to the locker engagement mechanism 110. For example, the locker engagement mechanism 110 may have one or more screws attached to removably affix one or more springs to the locker engagement mechanism 110. In some embodiments, such as shown in FIG. 7, the two locker engagement mechanism springs 30, 35 may be attached to one of the first or second spring attachment surfaces 190, 195 of the braking mechanism frame 165 at opposite side so the wheel, such that the springs provide a force in opposite directions of one another restricting the amount of movement of the locker engagement mechanism 110.

Referring now to Block 430 of FIG. 4, the method of operating a protection device for navigating the guide member includes rotating the first locker 115 to engage with a braking surface after releasing the first locker. As discussed above in relation to FIGS. 2A, 2B, and 3, the locker 115 may be released when the locker engagement mechanism 110 is actuated by the centrifugal actuator 105. In some embodiments, the first locker 115 may be spring biased, such that when the locker engagement mechanism 110 releases the first locker 115, the first locker is urged by the spring into engagement with the braking surface. After either locker 115, 120 is released, the locker may remain in the braking position even after the wheel slows below the threshold speed until the locker is reset by the user as described herein. For example, the locker engaging mechanism 110 in FIG. 3 has returned to a neutral position while the locker 115 remains engaged with the guide member 125.

In some embodiments, the first locker 115 rotates around the second axis 65. For example, the first locker 115 may be received by a locker slot 175 in the housing 135 along the second axis 65, such that the first locker 115 may be rotatably movable around the second axis. Similarly, as shown in FIGS. 6-8B, in some embodiments the second locker 120 may be received by another locker slot 175 in the housing 135 along the third axis 70. In some embodiments, the first locker 115 may have a first locker spring 40 attached at one end to a first spring attachment surface 190 of the braking mechanism frame 165 and another end to the first locker 115, such as a bolt 170 attached to the first locker 115. The first locker spring 40 may be used to determine the amount of force applied to the braking surface. For example, the stronger the first locker spring 40, the less force applied to the braking surface by the first locker.

Referring now to Block 440 of FIG. 4, in an instance when the wheel speed is at or above a second threshold speed in a second direction, the method of operating the protection device for navigating the guide member includes engaging and rotating a centrifugal actuator operatively coupled with the wheel. In some embodiments, the centrifugal actuator engaged is the same centrifugal actuator engaged in Block 410. Alternatively, a second centrifugal actuator may be provided in line with the centrifugal actuator discussed above in relation to Block 410. In some embodiments, a protection device 100 may have two or more centrifugal actuators 105, such as shown in FIG. 5, where a first centrifugal actuator is shown on one side of the wheel in communication with the first locker 115 and then a second centrifugal actuator on the other side of the wheel (not shown) is in communication with the second locker 120. As discussed herein with reference to FIG. 12, in some embodiments, the centrifugal component arms 20, 25 may be configured with respective actuating protrusions configured to engage with a locker engagement mechanism 110 at or above a certain speed in one or more directions.

Referring now to Block 450 of FIG. 4, the method of operating a protection device for navigating the guide member includes actuating a second locker engagement mechanism with the centrifugal actuator to release a second locker 120 (e.g., allowing the centrifugal actuator to expand into engagement with the locker engagement mechanism to rotate the locker engagement mechanism about the axis 60).

The release of the second locker 120 may be identical to the release of the first locker 115 as described above in reference to Block 420 of FIG. 4 (e.g., the locker engagement mechanism may release the second locker at or above the second threshold speed in the second direction in the same way the first locker is released at or above the first threshold speed in the first direction). In some embodiments, the second locker engagement mechanism may be configured identically to the locker engagement mechanism discussed throughout. In some embodiments, the second locker may be engaged by the same locker engagement mechanism as the first locker 115, such that the second locker 120 is released when the locker engagement mechanism rotates in the opposite direction as for the first locker 115. For example, the second locker 120 may have a second locker spring 45 attached at one end to the second spring attachment surface 195 of the braking mechanism frame 165 and at the other end to the second locker 120, such as a bolt 170 attached to the second locker 120. In some embodiments, the second locker 120 may be engaged with a different locker engagement mechanism than the first locker 115. For example, a separate centrifugal actuator 105 and locker engagement mechanism 110 may be provided on either sides of the wheel (e.g., the wheel may be symmetrical). In some embodiments, the same locker engagement mechanism 110 may be used for the second locker 120 as the first locker 115. For example, in an instance that the wheel speed is at or above a first threshold speed in a first direction, the locker engagement mechanism 110 may release the first locker 115, while the second locker 120 remains engaged, and in an instance that the wheel speed is at or above a second threshold speed in a second direction, the second locker 120 may be released, while the first locker 115 remains engaged. In such an example, the first threshold speed in the first direction may be the same speed as the second threshold speed in the second direction. In some embodiments, as described herein, a second locker engagement mechanism and centrifugal actuator, structured as shown in the locker engagement mechanism and centrifugal actuator discussed herein, may operate the second locker 120 on the opposite side of the wheel.

Referring now to Block 460 of FIG. 4, the method of operating a protection device for navigating the guide member includes rotating the second locker 120 to engage with a braking surface after the second locker is released. In some embodiments, the braking surface engaged by the second locker 120 may be the same surface engaged by the first locker 115 when activated. For example, as shown in FIG. 6, the guide member (e.g., cable 125) may be the braking surface engaged by both the first locker 115 and the second locker 120 when each locker is engaged with the braking surface (e.g., guide member cable 125) during the respective braking actions in either direction of movement. In some embodiments, the first locker 115 and the second locker 120 engage different sections of the guide member. In some embodiments, the first locker 115 and the second locker 120 may be configured to engage different surfaces (e.g., one locker may engage the guide member and the other locker may engage the wheel). In some embodiments, the second locker 120 may be spring biased, such that when a locker engagement mechanism 110 releases the second locker 120, the second locker is urged by the spring into engagement with the braking surface. After either locker 115, 120 is released, the respective locker may remain in the braking position even after the wheel slows below the threshold speed until the locker is reset by the user as described herein. For example, the locker engaging mechanism 110 in FIG. 3 has returned to a neutral position while the locker 115 remains engaged with the guide member 125.

Referring now to FIG. 8A, an exterior view of the protection device 100 is shown with an actuator arm 140 and an actuator plate 145 configured to reset the locker(s) into the engaged position with one or more locker engagement mechanism 110. As discussed in relation to FIG. 9 below, the actuator arm 140 is configured to move the actuator plate 145 to cause one or more of the locker(s) to be engaged with at least one locker engagement mechanism. In an example embodiment, the first locker actuator plate connector 150 is attached to the first locker 115 at the second axis 65 at one end and the first locker actuator plate connector 150 at the other end and movable by the actuator plate 145. For example, as shown in FIG. 8A, each of the locker actuator plate connectors 150, 155 are engaged (e.g., via pins) through a top slot 200 and a bottom slot 205. In an example embodiment, the respective locker actuator plate connector is attached to the braking mechanism frame 165 through the top slot 200 and to the respective locker 115, 120 through the bottom slot 205. In some embodiments, each of the first locker actuator plate connector may have their own respective top slots 200 and/or bottom slots 205. In such an embodiment, as the first locker actuator plate connection 150 may be rotated back with the locker engagement mechanism.

In some embodiments, the actuator arm 140 may be configured to be rotatable around a first arm attachment point 210 where the actuator arm is coupled with the housing 135. In such an embodiment, the actuator arm 140 may be connected to a actuator plate bolt 220, the actuator plate bolt 220 may be configured to be received by an actuator arm slot 225 and attached to the braking mechanism frame 165 at one end and the actuator arm at the other end. In such embodiments, the actuator plate bolt 220 may be configured such that as the actuator arm 140 is rotated, the actuator plate 145 travels along the actuator arm slot 225 causing horizontal motion (e.g., horizontal referenced from position of protection device in FIGS. 8A and 8B) for the actuator plate 145. The actuator arm 140 may have an actuator arm attachment 160 connected at actuator arm attachment point 215 that allow for the protection device to be attached to a user and/or object. The actuator arm attachment 160 may define a series of convoluted structures that collectively absorb the shock of a large load at the end of the attachment (e.g., a user's safety harness may be attached to the ring at the end of the actuator arm attachment 160). In some embodiments, the actuator arm 140 may be designed to withstand a certain static tension load based on the application of the protection device 100. For example, the actuator arm 140 may be designed to withstand a static tension load of 16 kN.

Referring now to FIG. 9, a flowchart illustrating the reset mechanism of a protection device in accordance with the present disclosure is provided. Reset mechanisms, such as those shown and describe with respect to FIGS. 8A, 8B, and 10A-11B allow for effective operation of protection devices by allowing quick manual resets after a locker has triggered and seized against the braking surface. The reset mechanisms described herein also allow the protection device to remain locked at a fixed position on the guide member until the user deems it safe to release the locker. Thus, as described herein, once the respective threshold speeds have been met in the respective directions of motion, the respective lockers may engage and not release until reset.

Referring now to Block 900 of FIG. 9, the method of resetting the protection device (e.g., releasing the locker(s) from the braking surface) may include moving an actuator arm 140 in a first engaging direction. As shown in FIG. 10A, at a first released position of the actuator arm 140, the first locker 115 is engaged with the cable 125. The first connector 150 is rotationally locked (e.g., with a key and corresponding slot) to the locker 115, such that triggering of the locker rotates the upper end of the first connector from the position shown in FIG. 8A, in which the first connector is angled inwardly toward the actuator arm 140, to the position shown in FIG. 10A, in which the first connector is angled outwardly. In the depicted embodiment, rotating the actuator arm 140 in a counter-clockwise direction from the position shown in FIG. 10A to the position shown in FIG. 11A causes the actuator 145 plate to pull the upper end of the first connector 150 and rotate both the first connector and first locker 115. In an example embodiment, as shown in FIG. 11A, the actuator arm 140 may be moved in first direction from the first released (e.g., triggered) position (e.g., FIG. 10A) to a second engaged (e.g., reset) position (e.g., FIG. 11A).

Referring now to Block 910 of FIG. 9, based on the movement of the actuator arm 140 in the first engaging direction, the method of resetting the protection device may include the actuator plate 145 causing a first locker 115 to rotatably engage the locker engagement mechanism 110 to deflect the locker engagement mechanism downwardly and reset the locker holder mechanism 10 (shown in FIG. 1) beneath the engagement member of the locker engagement mechanism such that the locker is reset and no longer braking and spring 40 of the locker 115 again urges the locker against the locker engagement mechanism. In an example embodiment, as the actuator arm 140 is moved from the first released position to the second engaged position, the actuator plate 145 may be moved from a released position to a reset position causing the first locker actuator plate connector 150 to move, as seen between FIGS. 10A and 10B, cause the first locker 115 to rotate.

Referring now to Block 920 of FIG. 9, the method of resetting the protection device may include moving the actuator arm 140 in a second engaging direction to reset the second locker 120 in the same manner as resetting the first locker. The second locker may be reset whenever the locker is triggered, independent of the trigger and reset of the first locker. In some embodiments, the actuator plate 145 may be configured symmetrically and may have an actuator plate on both sides of the housing, such that when the actuator arm 140 is moved into the second engaging direction, that the actuator plate 145 engages the second locker actuator plate connector 155 in the same manner as the actuator plate engages the first locker actuator plate connector 150 in Block 910.

Referring now to Block 930 of FIG. 9, based on the movement of the actuator arm 140 in the second engaging direction, the method of resetting the protection device 100 may include the actuator plate 145 causing a second locker 120 to rotatably engage the second locker engagement mechanism. As the second locker actuator plate connector 155 is contacted by the actuator plate, the second locker 120 is caused to rotate about the third axis 70 until the locker holder mechanism of the second locker contacts and engages the engaging component of the second locker engagement mechanism in the same manner and structure as the first locker engagement mechanism 110. In an example embodiment, when the first locker 115 and/or the second locker is engaged by one or more locker engagement mechanisms and the lockers are thereby retained in an operational, non-braking position, the wheel may then freely travel along the guide member.

Referring now to FIG. 14, an exterior view of a protection device 100 is provided in accordance with an example embodiment of the present embodiment. In some embodiments, the protection device 100 may be bilaterally symmetrical, such that all, or part, of the described components herein of one half of the device are mirrored in the other half of the device. For example, there may be an actuator plate 145 on each side of the housing, such that separate actuator arms 140 may be provided. In such embodiments, the plurality of actuator arms may be connected to one another, as shown in FIG. 14, such that one motion will move the actuator arms 140 and actuator plates 145 on both sides of the protection device 100. Additionally, in some embodiments, only some of the components described herein may be mirrored. For example, a housing may only be provided on one side of the wheel.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A protection device for traversing a guide member, the protection device comprising:
    a wheel configured to engage the guide member;
    a first locker configured to engage a braking surface;
    a locker engagement mechanism configured to releasably engage the first locker;
    a centrifugal actuator operatively coupled to the wheel and configured to actuate the locker engagement mechanism to release the first locker based on a first threshold speed of the wheel,
    wherein in an instance in which the wheel is rotating at or above the first threshold speed of the wheel in a first direction, the centrifugal actuator is configured to actuate and rotate the locker engagement mechanism to release the first locker and to allow the first locker to rotate and engage the braking surface;
    a second locker configured to engage the braking surface, wherein in an instance in which the wheel is rotating at or above a second threshold speed in a second direction opposite the first direction, the centrifugal actuator is configured to actuate and rotate the locker engagement mechanism to allow the second locker to rotate and engage the braking surface; and
    an actuator plate and an actuator arm, wherein the first locker and the second locker are coupled to the actuator plate, wherein the actuator arm is configured to move the actuator plate in a first engaging direction to cause the first locker to rotatably engage the locker engagement mechanism, wherein the actuator arm is configured to move the actuator plate in a second engaging direction to cause the second locker to rotatably engage the locker engagement mechanism.

2. The protection device of claim 1, wherein in an instance in which the wheel is rotating at or above the first threshold speed of the wheel in the second direction, the locker engagement mechanism is configured to remain engaged with the first locker.

3. The protection device of claim 1, wherein the actuator plate is connected to the first locker and the actuator arm is configured to move from a first released position to a second engaging position to move the actuator plate to cause the first locker to rotatably engage the locker engagement mechanism.

4. The protection device of claim 1, wherein the centrifugal actuator is disposed within a circumference of the wheel.

5. The protection device of claim 1, wherein the centrifugal actuator comprises a centrifugal component arm within a circumference of the wheel.

6. The protection device of claim 5, wherein the locker engagement mechanism comprises a ring actuated by the centrifugal component arm inside of the wheel, the ring comprising a protrusion around a portion of the ring configured to restrict the rotatable movement of the first locker below the first threshold speed of the wheel in the first direction.

7. The protection device of claim 1 wherein the wheel rotates on a first axis and the first locker rotates on a second axis, wherein the centrifugal actuator rotates on the first axis, and wherein the second axis is outside of a circumference of the wheel.

8. A protection device for navigating a guide member, the protection device comprising:
a wheel configured to rotatably engage the guide member;
a first locker and a second locker, the first locker and the second locker configured to engage a braking surface;
at least one locker engagement mechanism configured to releasably engage at least one of the first locker or the second locker;
at least one centrifugal actuator operatively coupled to the wheel and configured to actuate at least one of the at least one locker engagement mechanism to release at least one of the first locker at a first threshold speed of the wheel or the second locker at a second threshold speed of the wheel; and
wherein in an instance in which the wheel is rotating at or above the first threshold speed of the wheel in a first direction, one of the at least one centrifugal actuator is configured to actuate and rotate one of the at least one locker engagement mechanism to release the first locker and to allow the first locker to rotate and engage the braking surface, and
wherein in an instance in which the wheel is rotating at or above the second threshold speed of the wheel in a second direction, one of the at least one centrifugal actuator is configured to actuate and rotate one of the at least one locker engagement mechanism to release the second locker and to allow the second locker to rotate and engage the braking surface; and
an actuator plate and an actuator arm, wherein the first locker and the second locker are coupled to the actuator plate,
wherein the actuator arm is configured to move the actuator plate in a first engaging direction to cause the first locker to rotatably engage at least one of the at least one locker engagement mechanism, and wherein the actuator arm is configured to move the actuator plate in a second engaging direction to cause the second locker to rotatably engage at least one of the at least one locker engagement mechanism.

9. The protection device of claim 8, wherein the first threshold speed and the second threshold speed are equal.

10. The protection device of claim 8, wherein in an instance in which the wheel is rotating at or above the first threshold speed of the wheel in the second direction, at least one of the at least one locker engagement mechanism is configured to remain engaged with the first locker, and
wherein in an instance in which the wheel is rotating at or above the second threshold speed of the wheel in the first direction, at least one of the at least one locker engagement mechanism is configured to remain engaged with the second locker.

11. The protection device of claim 8 wherein at least one of the at least one centrifugal actuator is configured within a circumference of the wheel.

12. The protection device of claim 8, wherein at least one of the at least one centrifugal actuator comprises a centrifugal component arm inside a circumference of the wheel.

13. The protection device of claim 12, wherein at least one of the at least one locker engagement mechanism comprises a ring actuated by the centrifugal component arm inside of the wheel, the ring comprising a protrusion around a portion of the ring configured to restrict the rotatable movement of at least one of the first locker below the first threshold speed of the wheel in the first direction or the second locker below the second threshold speed of the wheel in the second direction.

14. The protection device of claim 8 wherein the wheel rotates on a first axis and the first locker rotates on a second axis, wherein the second locker rotates on a third axis, wherein the at least one centrifugal actuator rotates on the first axis, and wherein the second axis and the third axis are outside of a circumference of the wheel.

15. A method of operating a braking device comprising:
engaging a wheel with a guide member;
rotating a centrifugal actuator operatively coupled with the wheel at or above a first threshold speed of the wheel in a first direction;
wherein based on the engagement of the centrifugal actuator, a locker engagement mechanism is configured to release a first locker; and
wherein the first locker is configured to rotate to engage with a braking surface;
wherein in an instance in which the wheel is rotating at or above the first threshold speed of the wheel in the first direction, the centrifugal actuator is configured to actuate and rotate the locker engagement mechanism to release the first locker and to allow the first locker to rotate and engage the braking surface,
engaging a second locker with the braking surface, wherein in an instance in which the wheel is rotating at or above a second threshold speed in a second direction opposite the first direction, the centrifugal actuator is configured to actuate and rotate the locker engagement mechanism to allow the second locker to rotate and engage the braking surface; and
wherein the first locker and the second locker are coupled to an actuator plate, wherein an actuator arm is configured to move the actuator plate in a first engaging direction to cause the first locker to rotatably engage the locker engagement mechanism, and wherein the actuator arm is configured to move the actuator plate in a second engaging direction to cause the second locker to rotatably engage the locker engagement mechanism.

16. The method of claim 15 wherein rotation of the first locker is further configured to displace the actuator plate, and wherein displacement of the actuator plate is configured to rotate the actuator arm from a first released position to a second engaging position.

17. The method of claim 15, further comprising resetting the braking device by:
- moving the actuator arm in the first engaging direction; and
- based on the movement of the actuator arm in the first engaging direction, causing, via the actuator plate, the first locker to rotatably engage the locker engagement mechanism and release the guide member.

\* \* \* \* \*